(12) United States Patent
Eckel et al.

(10) Patent No.: US 12,511,192 B2
(45) Date of Patent: Dec. 30, 2025

(54) INFORMATION BROADCAST TECHNIQUES FOR STACKED MEMORY ARCHITECTURES

(71) Applicant: Micron Technology, Inc., Boise, ID (US)

(72) Inventors: Nathan A Eckel, Lufkin, TX (US); James Brian Johnson, Boise, ID (US); Paul A. Laberge, Shoreview, MN (US)

(73) Assignee: Micron Technology, Inc., Boise, ID (US)

( * ) Notice: Subject to any disclaimer, the term of this patent is extended or adjusted under 35 U.S.C. 154(b) by 47 days.

(21) Appl. No.: 18/667,799

(22) Filed: May 17, 2024

(65) Prior Publication Data

US 2024/0403165 A1 Dec. 5, 2024
US 2025/0272193 A2 Aug. 28, 2025

Related U.S. Application Data

(60) Provisional application No. 63/470,657, filed on Jun. 2, 2023.

(51) Int. Cl.
*G06F 11/00* (2006.01)
*G06F 11/10* (2006.01)
*G06F 11/14* (2006.01)

(52) U.S. Cl.
CPC ...... *G06F 11/1068* (2013.01); *G06F 11/1417* (2013.01)

(58) Field of Classification Search
CPC .................. G06F 11/1068; G06F 11/1417
See application file for complete search history.

(56) References Cited

U.S. PATENT DOCUMENTS

| | | | |
|---|---|---|---|
| 10,553,260 B2 * | 2/2020 | Shin | G06F 3/0611 |
| 10,635,622 B2 * | 4/2020 | Bilski | G06F 13/1684 |
| 11,182,110 B1 * | 11/2021 | Ansari | G06F 5/06 |
| 11,481,154 B2 * | 10/2022 | Dutta | G11C 5/04 |
| 11,567,881 B1 * | 1/2023 | Bilski | G06F 13/102 |
| 12,020,774 B2 * | 6/2024 | Bhatia | G11C 7/222 |

* cited by examiner

*Primary Examiner* — Esaw T Abraham
(74) *Attorney, Agent, or Firm* — Holland & Hart LLP

(57) ABSTRACT

Methods, systems, and devices for information broadcast techniques for stacked memory architectures are described. A semiconductor system may include multiple instances of interface circuitry of a semiconductor die that are each operable for accessing a respective set of one or more memory arrays of one or more other semiconductor dies, as well as read-only storage for storing information that is common to the multiple instances of the interface circuitry. In some implementations, such read-only storage may include one-time programmable memory elements (e.g., fuses, antifuses) that are located in at least one of the one or more other semiconductor dies, and are accessible by each of the multiple instances of interface circuitry. The read-only storage may store information that supports common aspects of interface circuitry operations such as initialization operations, evaluation operations, configuration operations, access operations, or other operations, which may be broadcast to the multiple instances of interface circuitry.

20 Claims, 7 Drawing Sheets

INFORMATION BROADCAST TECHNIQUES FOR STACKED MEMORY ARCHITECTURES

CROSS REFERENCE

The present Application for Patent claims priority to U.S. Patent Application No. 63/470,657 by Eckel et al., entitled "INFORMATION BROADCAST TECHNIQUES FOR STACKED MEMORY ARCHITECTURES," filed Jun. 2, 2023, which is assigned to the assignee hereof, and which is expressly incorporated by reference in its entirety herein.

TECHNICAL FIELD

The following relates to one or more systems for memory, including information broadcast techniques for stacked memory architectures.

BACKGROUND

Memory devices are widely used to store information in devices such as computers, user devices, wireless communication devices, cameras, digital displays, and others. Information is stored by programming memory cells within a memory device to various states. For example, binary memory cells may be programmed to one of two supported states, often denoted by a logic 1 or a logic 0. In some examples, a single memory cell may support more than two states, any one of which may be stored. To access the stored information, the memory device may read (e.g., sense, detect, retrieve, determine) states from the memory cells. To store information, the memory device may write (e.g., program, set, assign) states to the memory cells.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), self-selecting memory, chalcogenide memory technologies, not-or (NOR) and not-and (NAND) memory devices, and others. Memory cells may be described in terms of volatile configurations or non-volatile configurations. Memory cells in a non-volatile configuration may maintain stored logic states for extended periods of time even in the absence of an external power source. Memory cells in a volatile configuration may lose stored states when disconnected from an external power source.

DETAILED DESCRIPTION

Figure 1:
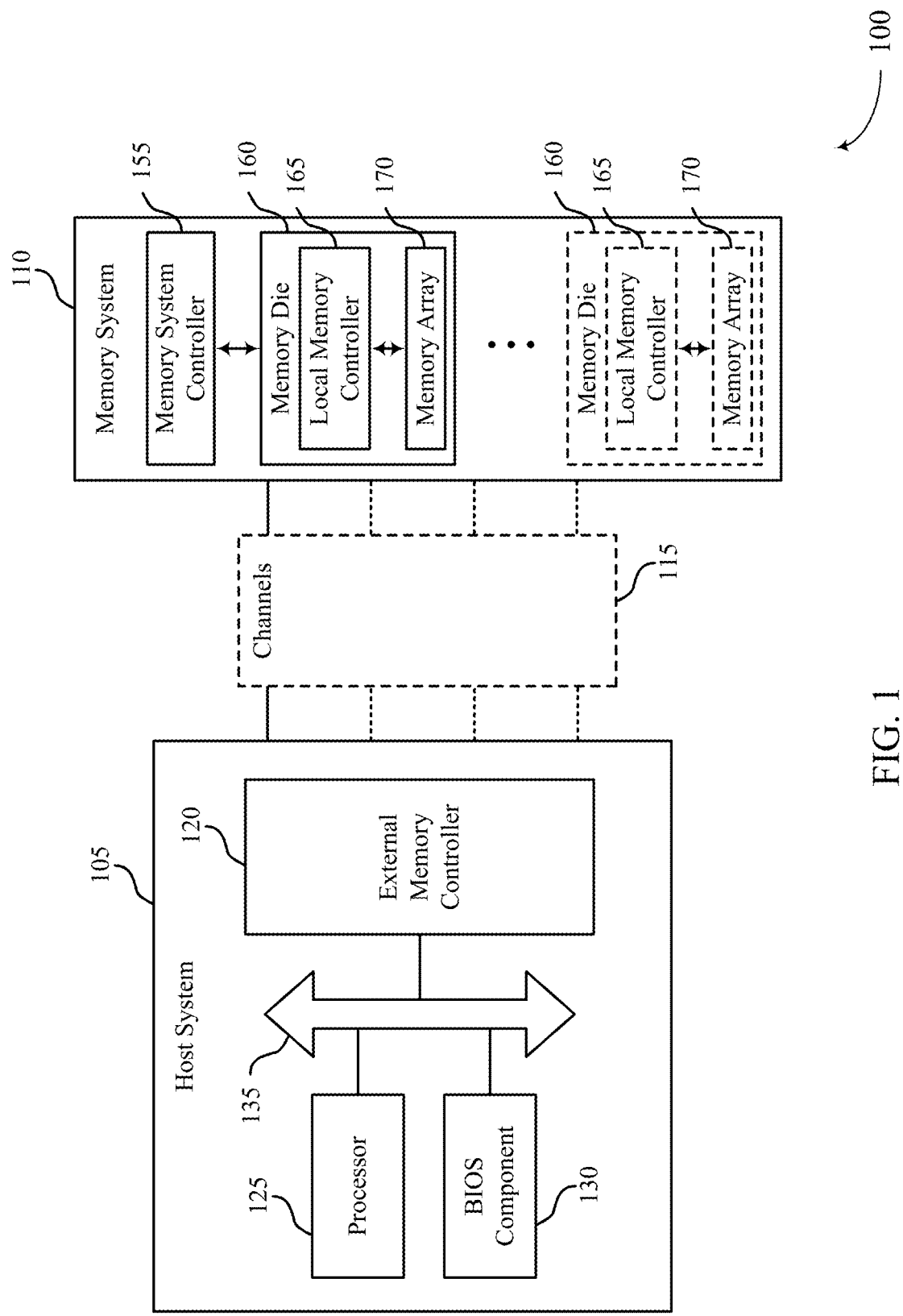
FIG. 1 shows an example of a system that supports information broadcast techniques for stacked memory architectures in accordance with examples as disclosed herein.

Some memory systems may include a stack of semiconductor dies, including one or more memory dies above a logic die operable to access a set of memory arrays distributed across the one or more memory dies. The logic die may include one or more interface blocks (e.g., memory interface blocks (MIBs), interface circuitry), which may each be operable to access a respective subset of the set of memory arrays (e.g., via a respective set of one or more channels). Such an architecture may be implemented as part of a coupled dynamic random access memory (DRAM) system, and may support solutions for memory-centric logic, such as graphics processing units (GPUs), among other implementations. In some examples, a 3D stacked memory system may be closely coupled (e.g., physically coupled, electrically coupled) with a processor, such as a GPU or other host, as part of a physical memory map accessible to the processor. Such coupling may include one or more processors being implemented in a same semiconductor die as at least a portion of a 3D stacked memory system (e.g., a same die as the one or more interface blocks, as part of a logic die), or a processor being implemented in a die that is directly coupled (e.g., fused) with another die that includes at least a portion of a 3D stacked memory system. Unlike cache-based memory, a 3D stacked memory system may not be backed by a level of external memory with the same physical addresses. For example, a 3D stacked memory system may be associated with and located within a dedicated base address, where each portion of the 3D stacked memory system may be non-overlapping within the address.

In some examples, interface circuitry (e.g., interface blocks) of a logic die in such a memory system (e.g., a 3D stacked memory system) may perform operations, such as initialization operations, evaluation operations, configuration operations, access operations, or other operations based on information (e.g., instructions, parameters, configuration information) stored at such a memory system. In some examples, the information used to perform such operations may be common to (e.g., identical for) multiple instances of the interface circuitry, and storage of or retrieval of multiple instances of such information may be associated with an inefficient allocation of resources (e.g., storage area, energy resources) or operational latency at the memory system.

In accordance with examples as disclosed herein, a semiconductor system may include multiple instances of interface circuitry of a semiconductor die (e.g., a logic die) that are each operable for accessing a respective set of one or more memory arrays of one or more other semiconductor dies (e.g., one or more array dies), as well as read-only storage for storing information that is common to (e.g., shared by) the multiple instances of the interface circuitry. In some implementations, such read-only storage may include one-time programmable (OTP) memory elements (e.g., fuses, antifuses) that are located in at least one of the other semiconductor dies (e.g., different from a semiconductor die that includes the instances of interface circuitry), and are accessible by (e.g., coupled with) each of the multiple instances of interface circuitry. For example, fuses may be an example of such OTP memory elements that are initially in a conductive state, but may be programmed by physically altering the memory element (e.g., in a one-way programming operation) to a non-conductive state, and antifuses may be an example of such OTP memory elements that are initially in a non-conductive state, but may be programmed by physically altering the memory element (e.g., in a one-way programming operation) to a conductive state.

At least a portion of the read-only storage may store information that supports common aspects of interface circuitry operations such as initialization operations, evaluation operations, configuration operations, access operations, or other operations. In some examples, the common information stored in the read-only storage may be broadcast to the multiple instances of interface circuitry (e.g., via a shared bus) based on determining to evaluate, access, or initialize aspects of the semiconductor system. In some such examples, the read-only storage may also include information specific to a certain instance of the interface circuitry (e.g., trim parameters, repair configurations), which may include information associated with operating a respective set of one or more memory arrays accessible by the certain instance of the interface circuitry. Storing common information in shared read-only storage of such a semiconductor system may reduce an allocation of storage space that would be otherwise associated with repeated instances of common information, or may reduce latency or power consumption associated with providing such information separately to multiple instances of interface circuitry, among other benefits.

Features of the disclosure are initially described in the context of systems, dies, and an OTP memory element layout as described with reference to FIGS. 1 through 4. These and other features of the disclosure are further illustrated by and described in the context of an apparatus diagram and flowcharts with reference to FIGS. 5 through 7.

FIG. 1 illustrates an example of a system 100 that supports information broadcast techniques for stacked memory architectures in accordance with examples as disclosed herein. The system 100 may include portions of an electronic device, such as a computing device, a mobile computing device, a wireless communications device, a graphics processing device, a vehicle, or other systems. The system 100 includes a host system 105, a memory system 110, and one or more channels 115 coupling the host system 105 with the memory system 110 (e.g., to provide a communicative coupling). The system 100 may include one or more memory systems 110, but aspects of the one or more memory systems 110 may be described in the context of a single memory system 110.

The host system 105 may be an example of a processor (e.g., circuitry, processing circuitry, a processing component) that uses memory to execute processes, such as a processing system of a computing device, a mobile computing device, a wireless communications device, a graphics processing device, a wearable device, an internet-connected device, a vehicle controller, a system on a chip (SoC), or other stationary or portable electronic device, among other examples. The host system 105 may include one or more of an external memory controller 120, a processor 125, a basic input/output system (BIOS) component 130, or other components (e.g., a peripheral component, an input/output controller, not shown). The components of the host system 105 may be coupled with one another using a bus 135.

An external memory controller 120 may be configured to enable communication of information (e.g., data, commands, control information, configuration information) between components of the system 100 (e.g., between components of the host system 105, such as the processor 125, and the memory system 110). An external memory controller 120 may process (e.g., convert, translate) communications exchanged between the host system 105 and the memory system 110. In some examples, an external memory controller 120, or other component of the system 100, or associated functions described herein, may be implemented by or be part of the processor 125. For example, an external memory controller 120 may be hardware, firmware, or software (e.g., instructions), or some combination thereof implemented by a processor 125 or other component of the system 100 or the host system 105. Although an external memory controller 120 is illustrated outside the memory system 110, in some examples, an external memory controller 120, or its functions described herein, may be implemented by one or more components of a memory system 110 (e.g., a memory system controller 155, a local memory controller 165) or vice versa. In various examples, the host system 105 or an external memory controller 120 may be referred to as a host.

A processor 125 may be operable to provide functionality (e.g., control functionality) for the system 100 or the host system 105. A processor 125 may be a general-purpose processor, a digital signal processor (DSP), an application-specific integrated circuit (ASIC), a field-programmable gate array (FPGA) or other programmable logic device, discrete gate or transistor logic, discrete hardware components, or any combination thereof. In some examples, a processor 125 may be an example of a central processing unit (CPU), a graphics processing unit (GPU), a general-purpose GPU (GPGPU), or an SoC, among other examples.

In some examples, the system 100 or the host system 105 may include an input component, an output component, or a combination thereof. Input components may include a sensor, a microphone, a keyboard, another processor (e.g., on a printed circuit board), an interface (e.g., a user interface, an interface between other devices), or a peripheral that interfaces with system 100 via one or more peripheral components, among other examples. Output components may include a display, audio speakers, a printing device, another processor on a printed circuit board, or a peripheral that interfaces with the system 100 via one or more peripheral components, among other examples.

The memory system 110 may be a component of the system 100 that is operable to provide physical memory locations (e.g., addresses) that may be used or referenced by the system 100. The memory system 110 may include a memory system controller 155 and one or more memory dies 160 (e.g., memory chips) to support a capacity for data storage. The memory system 110 may be configurable to work with one or more different types of host systems 105, and may respond to and execute commands provided by the host system 105 (e.g., via an external memory controller 120). For example, the memory system 110 (e.g., a memory system controller 155) may receive a write command indicating that the memory system 110 is to store data received from the host system 105, or receive a read command indicating that the memory system 110 is to provide data stored in a memory die 160 to the host system 105, or receive a refresh command indicating that the memory system 110 is to refresh data stored in a memory die 160, among other types of commands and operations.

A memory system controller 155 may include components (e.g., circuitry, logic) operable to control operations of the memory system 110. A memory system controller 155 may include hardware, firmware, or instructions that enable the memory system 110 to perform various operations, and may be operable to receive, transmit, or execute commands, data, or control information related to operations of the memory system 110. A memory system controller 155 may be operable to communicate with one or more of an external memory controller 120, one or more memory dies 160, or a processor 125. In some examples, a memory system controller 155 may control operations of the memory system 110 in cooperation with a local memory controller 165 of a memory die 160.

Each memory die 160 may include a local memory controller 165 and a memory array 170. A memory array 170 may be a collection of memory cells, with each memory cell being operable to store one or more bits of data. A memory die 160 may include a two-dimensional (2D) array of memory cells, or a three-dimensional (3D) array of memory cells. In some examples, a 2D memory die 160 may include a single memory array 170. In some examples, a 3D memory die 160 may include two or more memory arrays 170, which may be stacked or positioned beside one another (e.g., relative to a substrate).

A local memory controller 165 may include components (e.g., circuitry, logic) operable to control operations of a memory die 160. In some examples, a local memory controller 165 may be operable to communicate (e.g., receive or transmit data or commands or both) with a memory system controller 155. In some examples, a memory system 110 may not include a memory system controller 155, and a local memory controller 165 or an external memory controller 120 may perform various functions described herein. As such, a local memory controller 165 may be operable to communicate with a memory system controller 155, with other local memory controllers 165, or directly with an external memory controller 120, or a processor 125, or any combination thereof. Examples of components that may be included in a memory system controller 155 or a local memory controller 165 or both may include receivers for receiving signals (e.g., from the external memory controller 120), transmitters for transmitting signals (e.g., to the external memory controller 120), decoders for decoding or demodulating received signals, encoders for encoding or modulating signals to be transmitted, sense components for sensing states of memory cells of a memory array 170, write components for writing states to memory cells of a memory array 170, or various other components operable for supporting described operations of a memory system 110.

A host system 105 (e.g., an external memory controller 120) and a memory system 110 (e.g., a memory system controller 155) may communicate information (e.g., data, commands, control information, configuration information) using one or more channels 115. Each channel 115 may be an example of a transmission medium that carries information, and each channel 115 may include one or more signal paths (e.g., a transmission medium, an electrical conductor, an electrically conductive path) between terminals associated with the components of the system 100. For example, a channel 115 may be associated with a first terminal (e.g., including one or more pins, including one or more pads) at the host system 105 and a second terminal at the memory system 110. A terminal may be an example of a conductive input or output point of a device of the system 100, and a terminal may be operable to act as part of a channel 115. In some implementations, at least the channels 115 between a host system 105 and a memory system 110 may include or be referred to as a host interface (e.g., a physical host interface). In some implementations, a host interface may include or be associated with interface circuitry (e.g., signal drivers, signal latches) at the host system 105 (e.g., at an external memory controller 120), or at the memory system 110 (e.g., at a memory system controller 155), or both.

In some examples, a channel 115 (e.g., associated signal paths and terminals) may be dedicated to communicating one or more types of information. For example, the channels 115 may include one or more command and address channels, one or more clock signal channels, one or more data channels, among other channels or combinations thereof. In some examples, signaling may be communicated over the channels 115 using single data rate (SDR) signaling or double data rate (DDR) signaling. In SDR signaling, one modulation symbol (e.g., signal level) of a signal may be registered for each clock cycle (e.g., on a rising or falling edge of a clock signal). In DDR signaling, two modulation symbols of a signal may be registered for each clock cycle (e.g., on both a rising edge and a falling edge of a clock signal).

In some examples, at least a portion of the system 100 may implement a stacked die architecture in which multiple semiconductor dies are physically and communicatively coupled. In some implementations, one or more semiconductor dies may include multiple instances of interface circuitry (e.g., of a memory system 110, memory interface blocks) that are each associated with accessing a respective set of one or more memory arrays of one or more other semiconductor dies. The interface circuitry may perform operations, such as initialization operations, evaluation operations, configuration operations, access operations, or other operations based on information (e.g., instructions, parameters, configuration information) stored at the memory system 110. In some examples, the information used to perform such operations may be common to (e.g., identical for) multiple instances of the interface circuitry, and storage of or retrieval of multiple instances of such information may be associated with an inefficient allocation of resources (e.g., storage area, energy resources) or operational latency at the memory system 110.

In accordance with examples as disclosed herein, a semiconductor system that implements at least a portion of a system 100 (e.g., a memory system 110) may include multiple instances of interface circuitry of a semiconductor die (e.g., a logic die) that are each operable for accessing a respective set of one or more memory arrays of one or more other semiconductor dies (e.g., one or more array dies), as well as read-only storage for storing information that is common to (e.g., shared by) the multiple instances of the interface circuitry. In some implementations, such read-only storage may include one-time programmable (OTP) memory elements (e.g., fuses, antifuses) that are located in at least one of the other semiconductor dies (e.g., different from a semiconductor die that includes the instances of interface circuitry), and are accessible by (e.g., coupled with) each of the multiple instances of interface circuitry. At least a portion of the read-only storage may store information that supports common aspects of interface circuitry operations such as initialization operations, evaluation operations, configuration operations, access operations, or other operations. In some examples, the common information stored in the read-only storage may be broadcast to the multiple instances of interface circuitry (e.g., via a shared bus) based on determining to evaluate, access, or initialize aspects of the semiconductor system. In some such examples, the read-only storage may also include information specific to a certain instance of the interface circuitry (e.g., trim parameters, repair configurations), which may include information associated with operating a respective set of one or more memory arrays accessible by the certain instance of the interface circuitry. Storing common information in shared read-only storage of such a semiconductor system may reduce an allocation of storage space that would be otherwise associated with repeated instances of common information, or may reduce latency or power consumption associated with providing such information separately to multiple instances of interface circuitry, among other benefits.

In addition to applicability in systems as described herein, information broadcast techniques for stacked memory architectures may be generally implemented to support artificial intelligence applications. As the use of artificial intelligence increases to support machine learning, analytics, decision making, or other related applications, electronic devices that support artificial intelligence applications and processes may be desired. For example, artificial intelligence applications may be associated with accessing relatively large quantities of data for analytical purposes and may benefit from memory systems capable of effectively and efficiently storing relatively large quantities of data or accessing stored data relatively quickly. Implementing the techniques described herein may support artificial intelligence or machine learning techniques by storing commonly-accessible information for a relatively high quantity of interfaces (e.g., channels, data paths, support stacks) between a host and memory arrays of one or more semiconductor dies that are stacked over a logic die, which may decrease latency or bandwidth otherwise associated with initializing, evaluating, or configuring such systems, among other benefits.

Figure 2:
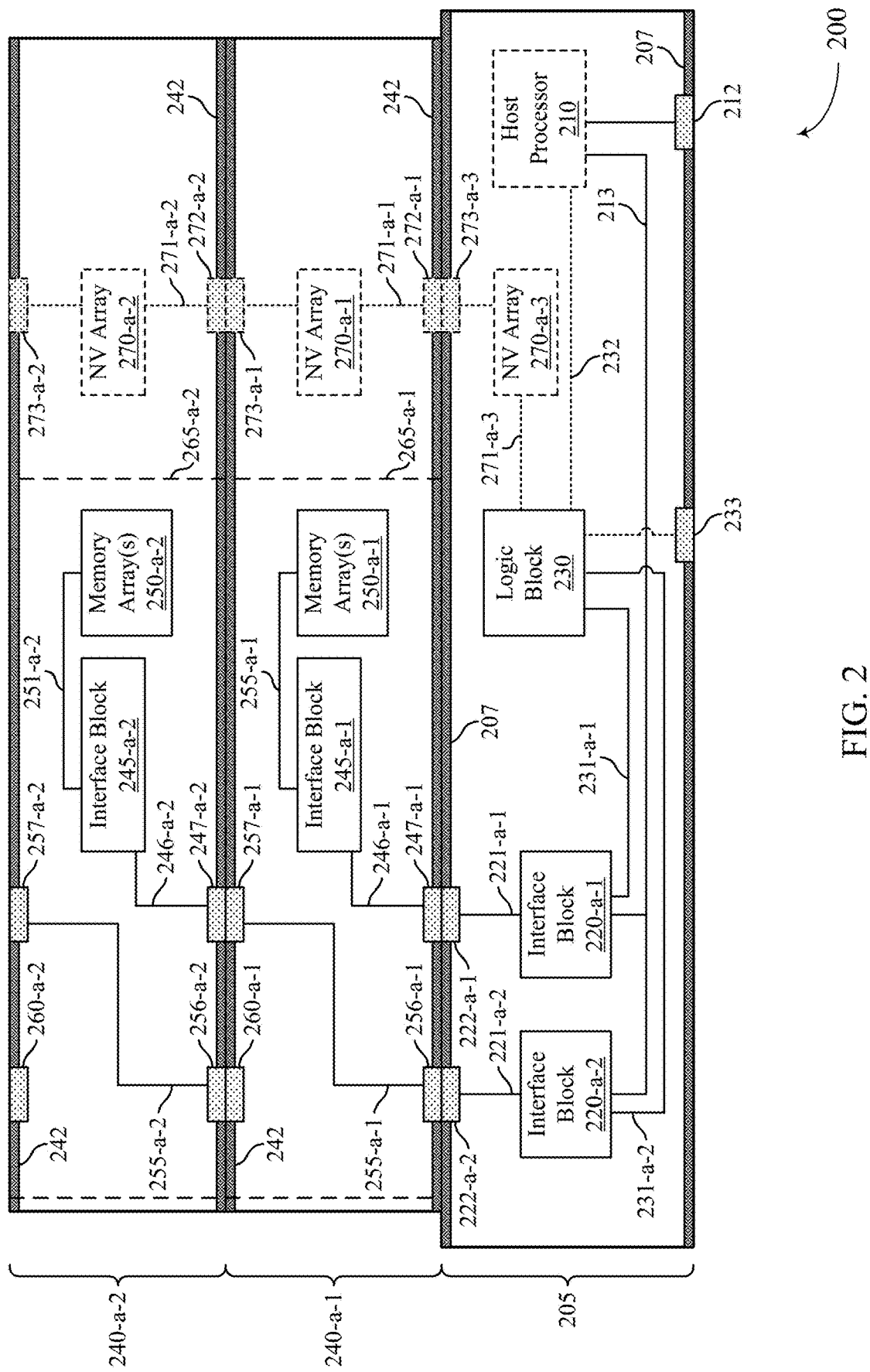
FIG. 2 shows an example of a system that supports information broadcast techniques for stacked memory architectures in accordance with examples as disclosed herein.

FIG. 2 illustrates an example of a system 200 (e.g., a semiconductor system, a system of coupled semiconductor dies) that supports information broadcast techniques for stacked memory architectures in accordance with examples as disclosed herein. The system 200 illustrates an example of a die 205 (e.g., a semiconductor die, a host die, a processor die, a logic die) that is coupled with one or more dies 240 (e.g., dies 240-*a*-1 and 240-*a*-2, semiconductor dies, memory dies, array dies). A die 205 or a die 240 may be formed using a respective semiconductor substrate (e.g., a substrate of crystalline semiconductor material such as silicon, germanium, silicon-germanium, gallium arsenide, or gallium nitride), or a silicon-on-insulator (SOI) substrate (e.g., silicon-on-glass (SOG), silicon-on-sapphire (SOS)), or epitaxial semiconductor materials formed on another substrate, among other examples. Although the illustrated example of a system 200 includes two dies 240, a system 200 in accordance with the described techniques may include any quantity of one or more dies 240 coupled with a die 205. Further, although non-limiting examples of the system 200 herein are generally described in terms of applicability to memory systems, memory sub-systems, memory devices, or a combination thereof, examples of the system 200 are not so limited. For example, aspects of the present disclosure may be applied as well to any computing system, computing sub-system, processing system, processing sub-system, component, device, structure, or other types of systems or sub-systems used for applications such as data collecting, data processing, data storage, networking, communication, power, artificial intelligence, system-on-a-chip, control, telemetry, sensing and monitoring, digital entertainment, or any combination thereof.

The system 200 illustrates an example of interface circuitry between a host and memory (e.g., via a host interface, via a physical host interface) that is implemented in (e.g., divided between) multiple semiconductor dies (e.g., a stack of directly coupled dies). For example, the die 205 may include a set of one or more interface blocks 220 (e.g., interface blocks 220-*a*-1 and 220-*a*-2, memory interface blocks), and each die 240 may include a set of one or more interface blocks 245 and one or more memory arrays 250 (e.g., die 240-*a*-1 including an interface block 245-*a*-1 coupled with a set of one or more memory arrays 250-*a*-1, die 240-*a*-2 including an interface block 245-*a*-2 coupled with a set of one or more memory arrays 250-*a*-2). In some implementations, the die 205 also may include a host processor 210. However, in some other implementations, a host processor 210 may be external to a die 205, such as in another semiconductor die or other component that is coupled with (e.g., communicatively coupled with, directly coupled with, bonded with) the die 205 via one or more contacts 212. Although the example of system 200 is illustrated with one interface block 245 included in each die 240, a die 240 in accordance with the described techniques may include any quantity of one or more interface blocks 245, each coupled with a respective set of one or more memory arrays 250, and each coupled with a respective interface block 220 of a die 205. Thus, the interface circuitry of a system 200 may include one or more interface blocks 220 of a die 205, with each interface block 220 being coupled with (e.g., in communication with) a corresponding interface block 245 of a die 240 (e.g., external to the die 205). In some examples, a coupled combination of an interface block 220 and an interface block 245 (e.g., coupled via a bus associated with one or more channels, such as one or more data channels, one or more control channels, one or more clock channels, or a combination thereof) may include or be referred to as a data path associated with a respective set of one or more memory arrays 250.

The host processor 210 may be an example of a host system 105, or a portion thereof (e.g., a processor 125, an external memory controller 120, or both). The host processor 210 may be configured to perform operations that implement storage of the memory arrays 250. For example, the host processor 210 may receive data read from the memory arrays 250, or may transmit data to be written to the memory arrays 250, or both (e.g., in accordance with an application or other operations of the host processor 210). The memory arrays 250 may be examples of memory arrays 170, and may include memory cells of various architectures, such as RAM, DRAM, SDRAM, SRAM, FeRAM, MRAM, RRAM, PCM, chalcogenide, NOR, or NAND memory cells, or any combination thereof. The host processor 210 may be configured to communicate (e.g., transmit, receive) signaling with the interface blocks 220 over a host interface 213 (e.g., a physical host interface), which may implement aspects of channels 115 described with reference to FIG. 1. For example, the host processor 210 may be configured to transmit access signaling (e.g., control signaling, access command signaling, configuration signaling) over a host interface 213, which may be received by the interface blocks 220 to support access operations (e.g., read operations, write operations) on the memory arrays 250.

A host interface 213 may include a respective set of one or more signal paths for each interface block 220, such that the host processor 210 may communicate with each interface block 220 over the respective set of signal paths (e.g., in accordance with a selection of the respective set to perform access operations via an interface block 220 that is selected by the host processor 210). Additionally, or alternatively, a host interface 213 may include one or more signal paths that are shared among multiple interface blocks 220, and an interface block 220, or a host processor 210, or both may interpret, ignore, respond to, or inhibit response to signaling over shared signal paths of the host interface 213 based on a logical indication (e.g., an addressing indication associated with the interface block 220 or an interface enable signal, which may be provided by the host processor 210 or the corresponding interface block 220, depending on signaling direction). In some examples, a host interface 213 may include one or more instances of control circuitry (e.g., memory controller circuitry), which may be associated with implementing aspects of an external memory controller 120. In some other examples, such control circuitry may be included in the host processor 210.

The die 205 may also include a logic block 230 (e.g., a shared logic block, a central logic block, common logic circuitry), which may be configured to communicate (e.g., transmit, receive) signaling with the interface blocks 220 of the die 205. In some cases, the logic block 230 may be configured to transmit information, which may include commands, indications, data, or other information to the interface blocks 220 to facilitate operations of the interface blocks 220. For example, the logic block 230 may be configured to transmit initialization or other configuration signaling, which may be received by the interface blocks 220 to support initialization or other configuration of the interface blocks 220 or other aspects of operating the dies 240 (e.g., via the respective interface blocks 245). The logic block 230 may be coupled with each interface block 220 via a respective bus 231 (e.g., bus 231-*a*-1 associated with the interface block 220-*a*-1, bus 231-*a*-2 associated with the interface block 220-*a*-2). In some examples, the respective buses 231 may each include a respective set of one or more signal paths, such that the logic block 230 may communicate with each interface block 220 over the respective set of signal paths. Additionally, or alternatively, the respective buses 231 may include one or more signal paths that are shared among multiple interface blocks 220 (not shown).

In some implementations, the logic block 230 may be configured to communicate (e.g., transmit, receive) signaling with the host processor 210 (e.g., over a bus 232, via a contact 212 for a host processor 210 external to a die 205) such that the logic block 230 may support an interface between the interface blocks 220 and the host processor 210. For example, the host processor 210 may be configured to transmit initialization signaling (e.g., boot commands), or other configuration or operational signaling, which may be received by the logic block 230 to support initialization, configuration, or other operation of the interface blocks 220. Additionally, or alternatively, in some implementations, the logic block 230 may be configured to communicate (e.g., transmit, receive) signaling with a component outside the system 200 (e.g., via a contact 233), such that the logic block 230 may support an interface that bypasses a host processor 210. In some examples, such implementations may support evaluations, configurations, or other operations of the system 200, via contacts 233 that are accessible at a physical interface of the system, during manufacturing, assembly, validation, or other operation associated with the system 200 (e.g., before coupling with a host processor 210, without implementing a host processor 210, for operations independent of a host processor).

Each interface block 220 may be coupled with at least a respective bus 221 of the die 205, and a respective bus 246 of a die 240, that is configured to communicate signaling with the corresponding interface block 245 (e.g., over one or more associated signal paths). For example, the interface block 220-*a*-1 may be coupled with the interface block 245-*a*-1 via a bus 221-*a*-1 and a bus 246-*a*-1, and the interface block 220-*a*-2 may be coupled with the interface block 245-*a*-2 via a bus 221-*a*-2 and a bus 246-*a*-2. In some examples, a die 240 may include a bus that bypasses operational circuitry of the die 240 (e.g., bypasses interface blocks 245 of a given die 240), such as a bus 255. For example, the interface block 220-*a*-2 may be coupled with the interface block 245-*a*-2 of the die 240-*a*-2 via a bus 255-*a*-1 of the die 240-*a*-1, which may bypass interface blocks 245 of the die 240-*a*-1. Such techniques may be extended for interconnection among more than two dies 240 (e.g., for interconnection via a respective bus 255 of multiple dies 240).

The respective signal paths of the buses 221, 246, and 255 may be coupled with one another, from one die to another, via various arrangements of contacts at the surfaces of interfacing dies. For example, the bus 221-*a*-1 may be coupled with the bus 246-*a*-1 via a contact 222-*a*-1 of (e.g., at a surface of) the die 205 and a contact 247-*a*-1 of the die 240-*a*-1, the bus 221-*a*-2 may be coupled with the bus 255-*a*-1 via a contact 222-*a*-2 of the die 205 and a contact 256-*a*-1 of the die 240-*a*-1, the bus 255-*a*-1 may be coupled with the bus 246-*a*-2 via a contact 257-*a*-1 of the die 240-*a*-1 and a contact 247-*a*-2 of the die 240-*a*-2, and so on. Although each respective bus is illustrated with a single line, coupled via singular contacts, it is to be understood that each signal path of a given bus may be associated with respective contacts to support a separate communicative coupling via each signal path of the given bus. In some examples, a bus 255 may traverse a portion of a die 240 (e.g., in an in-plane direction, along a direction different from a thickness direction, in a waterfall arrangement), which may support an arrangement of contacts 222 along a surface of the die 205 being coupled with interface blocks 245 of different dies 240 along a stack direction (e.g., via respective contacts 256 and 257 that are non-overlapping when viewed along a thickness direction).

The interconnection of interfacing contacts may be supported by various techniques. For example, in a hybrid bonding implementation, interfacing contacts may be coupled by a fusion of conductive materials (e.g., electrically conductive materials) of the interfacing contacts (e.g., without solder or other intervening material between contacts). For example, in an assembled condition, the coupling of the die 205 with the die 240-*a*-1 may include a conductive material of the contact 222-*a*-2 being fused with a conductive material of the contact 256-*a*-1, and the coupling of the die 240-*a*-1 with the die 240-*a*-2 may include a conductive material of the contact 257-*a*-1 being fused with a conductive material of the contact 247-*a*-2, and so on. In some examples, such coupling may include an inoperative fusion of contacts (e.g., a non-communicative coupling, a physical coupling), such as a fusion of the contact 260-*a*-1 with the contact 256-*a*-2, neither of which are coupled with operative circuitry of the dies 240-*a*-1 or 240-*a*-2. In some examples, such techniques may be implemented to improve coupling strength or uniformity (e.g., implementing contacts 260, which may not be operatively coupled with an interface block 245 or an interface block 220), or such a coupling may be a byproduct of a repetition of components that, in various configurations, may be operative or inoperative. (e.g., where, for dies 240 with a common arrangement of contacts 256 and 257, contacts 256-*a*-1 and 257-*a*-1 provide a communicative path between the interface block 245-*a*-2 and the interface block 220-*a*-2, but the contacts 256-*a*-2 and 257-*a*-2 do not provide a communicative path between an interface block 245 and an interface block 220).

In some examples, a fusion of conductive materials between dies (e.g., between contacts) may be accompanied by a fusion of other materials at one or more surfaces of the interfacing dies. For example, in an assembled condition, the coupling of the die 205 with the die 240-*a*-1 may include a dielectric material 207 (e.g., an electrically non-conductive material) of the die 205 being fused with a dielectric material 242 of the die 240-*a*-1, and the coupling of the die 240-*a*-1 with the die 240-*a*-2 may include a dielectric material 242 of the die 240-*a*-1 being fused with a dielectric material 242 of the die 240-*a*-2. In some examples, such dielectric materials may include an oxide, a nitride, a carbide, an oxide-nitride, an oxide-carbide, or other conversion or doping of a semiconductor material of the die 205 or dies 240, among other materials that may support such fusion. However, coupling among dies 205 and dies 240 may be implemented in accordance with other techniques, which may implement solder, adhesives, thermal interface materials, and other intervening materials.

In some examples, dies 240 may be coupled in a stack (e.g., forming a "cube" or other arrangement of dies 240), and the stack may subsequently be coupled with a die 205. In some examples, a respective set of one or more dies 240 may be coupled with each die 205 of multiple dies 205 formed in a wafer (e.g., in a chip-to-wafer bonding arrangement, before cutting the wafer of dies 205), and the dies 205, coupled with their respective set of dies 240, may be separated from one another (e.g., by cutting at least the wafer of dies 205). In some other examples, a respective set of one or more dies 240 may be coupled with a respective die 205 after the die 205 is separated from a wafer of dies 205 (e.g., in a chip-to-chip bonding arrangement).

The buses 221, 246, and 255 may be configured to provide a configured signaling (e.g., a coordinated signaling, a logical signaling, modulated signaling, digital signaling) between an interface block 220 and a corresponding interface block 245, which may involve various modulation or encoding techniques by a transmitting interface block (e.g., via a driver component of the transmitting interface block). In some examples, such signaling may be supported by (e.g., accompanied by) clock signaling communicated via the respective buses (e.g., in coordination with signal transmission). For example, the buses may be configured to convey one or more clock signals transmitted by the interface block 220 for reception by the interface block 245 (e.g., to trigger signal reception by a latch or other reception component of the interface block 245, to support clocked operations of the interface block 245). Additionally, or alternatively, the buses may be configured to convey one or more clock signals transmitted by the interface block 245 for reception by the interface block 220 (e.g., to trigger signal reception by a latch or other reception component of the interface block 220, to support clocked operations of the interface block 220). Such clock signals may be associated with the communication (e.g., unidirectional communication, bidirectional communication) of various signaling, such as control signaling, command signaling, data signaling, or any combination thereof. For example, the buses may include one or more signal paths for communications of a data bus (e.g., one or more data channels, a DQ bus, via a data interface of the interface blocks) in accordance with one or more corresponding clock signals (e.g., data clock signals), or one or more signal paths for communications of a control bus (e.g., a command/address (C/A) bus, via a command interface of the interface blocks) in accordance with one or more clock signals (e.g., control clock signals), or any combination thereof.

Interface blocks 220, interface blocks 245, and logic block 230 each may include circuitry (signaling circuitry, multiplexing circuitry, processing circuitry, controller circuitry) in various configurations (e.g., hardware configurations, logic configurations, software or instruction configurations) that support the functionality allocated to the respective block for accessing or otherwise operating a corresponding set of memory arrays 250. For example, interface blocks 220 may include circuitry configured to perform a first subset of operations that support access of the memory arrays 250, and interface blocks 245 may include circuitry configured to support a second subset of operations that support access of the memory arrays 250. In some examples, the interface blocks 220 and 245 may support a functional split or distribution of functionality associated with a memory system controller 155, a local memory controller 165, or both across multiple dies (e.g., a die 205 and at least one die 240). In some implementations, a logic block 230 may be configured to coordinate or configure aspects of the operations of the interface blocks 220, of the interface blocks 245, or both. Such operations, or subsets of operations, may include operations performed in response to commands from the host processor 210, or operations performed without commands from the host processor 210 (e.g., operations determined or initiated by an interface block 220, operations determined or initiated by an interface block 245, operations determined or initiated by a logic block 230), or various combinations thereof.

In some examples, the circuitry of interface blocks 220, interface blocks 245, or logic block 230, or any combination thereof may include components (e.g., transistors) formed at least in part from doped portions of a substrate of the respective die. In some examples, a substrate of a die 205 may have characteristics that are different from those of a substrate of a die 240. Additionally, or alternatively, in some examples, transistors formed from a substrate of a die 205 may have characteristics that are different from transistors formed from a substrate of a die 240 (e.g., in accordance with different transistor architectures).

A die 240 may include one or more units 265 (e.g., modules) that are separated from a semiconductor wafer having a pattern (e.g., a two-dimensional pattern) of units 265. Although each die 240 of the system 200 is illustrated with a single unit 265 (e.g., unit 265-*a*-1 of die 240-*a*-1, unit 265-*a*-2 of die 240-*a*-2), a die 240 in accordance with the described techniques may include any quantity of units 265, which may be arranged in various patterns (e.g., sets of one or more units 265 along a row direction, sets of one or more units 265 along a column direction, among other patterns). Each unit 265 may include at least the circuitry of a respective interface block 245, along with memory array(s) 250, a bus 251, a bus 246, and one or more contacts 247 corresponding to the respective interface block 245. In some examples, where applicable, each unit 265 may also include one or more buses 255, contacts 256, contacts 257, or contacts 260 (e.g., associated with a respective interface block 245 of a unit 265 of a different die 240), which may support various degrees of stackability or modularity among or via units 265 of other dies 240.

In some examples, the interface blocks 220 may include circuitry configured to receive first access command signaling from the host processor 210 (e.g., via a host interface 213, via one or more contacts 212 from a host processor 210 external to a die 205), and to transmit second access command signaling to the respective (e.g., coupled) interface block 245 based on (e.g., in response to) the received first access command signaling. The interface blocks 245 may accordingly include circuitry configured to receive the second access command signaling from the respective interface block 220, and to access a respective set of one or more memory arrays 250 based on (e.g., in response to) the received second access command signaling. In various examples, the first access command signaling may include access commands that are associated with a type of operation (e.g., a read operation, a write operation, a refresh operation, a memory management operation), which may be associated with an indication of an address of the one or more memory arrays 250 (e.g., a logical address, a physical address). In some examples, the first access command signaling may include an indication of a logical address associated with the memory arrays 250, and circuitry of an interface block 220 may be configured to generate the second access command signaling to indicate a physical address associated with the memory arrays 250 (e.g., a row address, a column address, using a logical-to-physical (L2P) table or other mapping or calculation functionality of the interface block 220).

In some examples, to support write operations of the system 200, circuitry of the interface blocks 220 may be configured to receive (e.g., from the host processor 210, via a host interface 213, via one or more contacts 212 from a host processor 210 external to a die 205) first data signaling associated with the first access command signaling, and to transmit second data signaling (e.g., associated with second access command signaling) based on received first access command signaling and first data signaling. The interface blocks 245 may accordingly be configured to receive second data signaling, and to write data to one or more memory arrays 250 (e.g., in accordance with an indicated address associated with the first access command signaling) based on the received second access command signaling and second data signaling. In some examples, the interface blocks 220 may include an error control functionality (e.g., error detection circuitry, error correction circuitry, error correction code (ECC) logic, an ECC engine) that supports the interface blocks 220 generating the second data signaling based on performing an error control operation using the received first data signaling (e.g., detecting or correcting an error in the first data signaling, determining one or more parity bits to be conveyed in the second data signaling and written with the data).

In some examples, to support read operations of the system 200, circuitry of the interface blocks 245 may be configured to read data from the memory arrays 250 based on received second access command signaling, and to transmit first data signaling based on the read data. The interface blocks 220 may accordingly be configured to receive first data signaling, and to transmit second data signaling (e.g., to the host processor 210, via a host interface 213, via one or more contacts 212 to a host processor 210 external to a die 205) based on the received first data signaling. In some examples, the interface blocks 220 may include an error control functionality that supports the interface blocks 220 generating the second data signaling based on performing an error control operation using the received first data signaling (e.g., detecting or correcting an error in the first data signaling, which may include a calculation involving one or more parity bits received with the first data signaling).

In some examples, access command signaling that is transmitted by the interface blocks 220 to the interface blocks 245 may be generated (e.g., based on access command signaling received from a host processor 210, based on initiation signaling received from a host processor 210, without receiving or otherwise independent from signaling from a host processor 210) in accordance with various determination or generation techniques configured at the interface blocks 220 (e.g., based on a configuration for accessing memory arrays 250 that is modified at the interface blocks 220). Such techniques may support the interface blocks 220 configuring aspects of the access operations performed on the memory arrays 250 by a respective interface block 245.

In some implementations, operations of the logic block 230, of the interface blocks 220, of the interface blocks 245, or of the memory arrays 250, or any combination thereof may be supported by information stored at the system 200. For example, a system 200 may include one or more storage locations, such as non-volatile (NV) arrays 270, which may be configured to store such information and output the information to one or more components of the system 200 to support the relevant operations. Such storage locations may be configured in various arrangements in a system 200. For example, NV arrays 270 may be located in a die 205, or in one or more dies 240, or any combination thereof (e.g., in both a die 205 and one or more dies 240). Information may be written to one or more NV arrays 270 during manufacturing of a system 200, during (e.g., based on) operations of the system 200, or both. In some examples, NV arrays 270 may be implemented as read-only memory (ROM) arrays.

In some implementations, a logic block 230 may be configured to communicate signaling with one or more of the NV arrays 270 of a system 200 (e.g., with supporting circuitry associated with operations of the NV arrays 270). For example, a logic block 230 may be coupled with one or more NV arrays 270 via one or more buses 271, and respective contacts 272 and 273, where applicable, which may each include one or more signal paths operable to communicate signaling (e.g., command signaling, data signaling) between the logic block 230 and the one or more NV arrays 270. In some examples, the interface blocks 220 may be configured to communicate signaling with one or more NV arrays 270, such that each interface block 220 may be coupled with one or more NV arrays 270 via a logic block 230 (e.g., via a respective bus 231) or via one or more signal paths directly (not shown).

In accordance with examples as disclosed herein, one or more NV arrays 270 may be implemented for storing information that is common to (e.g., shared by) multiple instances of interface circuitry, such as information that is common to multiple instances of interface blocks 220, or multiple instances of interface blocks 245, or both. In some implementations, NV arrays 270 may include one-time programmable (OTP) memory elements (e.g., fuses, anti-fuses) that are located in at least one of the dies 240, and may store information accessible by each of the interface blocks 220 of the die 205. At least a portion of the NV arrays 270 may store information that supports common aspects of interface circuitry operations, such as initialization operations, evaluation operations, configuration operations, access operations, or other operations of the interface blocks 220. In some examples, the common information stored in the NV arrays 270 may be broadcast to the multiple interface blocks 220 (e.g., via a shared bus) based on determining to evaluate, access, or initialize aspects of a system 200. In some such examples, the NV arrays 270 may also include information specific to a given one of the interface blocks 220 (e.g., trim parameters, repair configurations), which may include information associated with operating a respective set of one or more memory arrays 250 accessible by the given one of the interface blocks 220. Storing common information in NV arrays 270 (e.g., ROM arrays) may reduce an allocation of storage space that would be otherwise associated with repeated instances of common information, or may reduce latency or power consumption associated with providing such information separately to multiple interface blocks 220, among other benefits.

Figure 3:
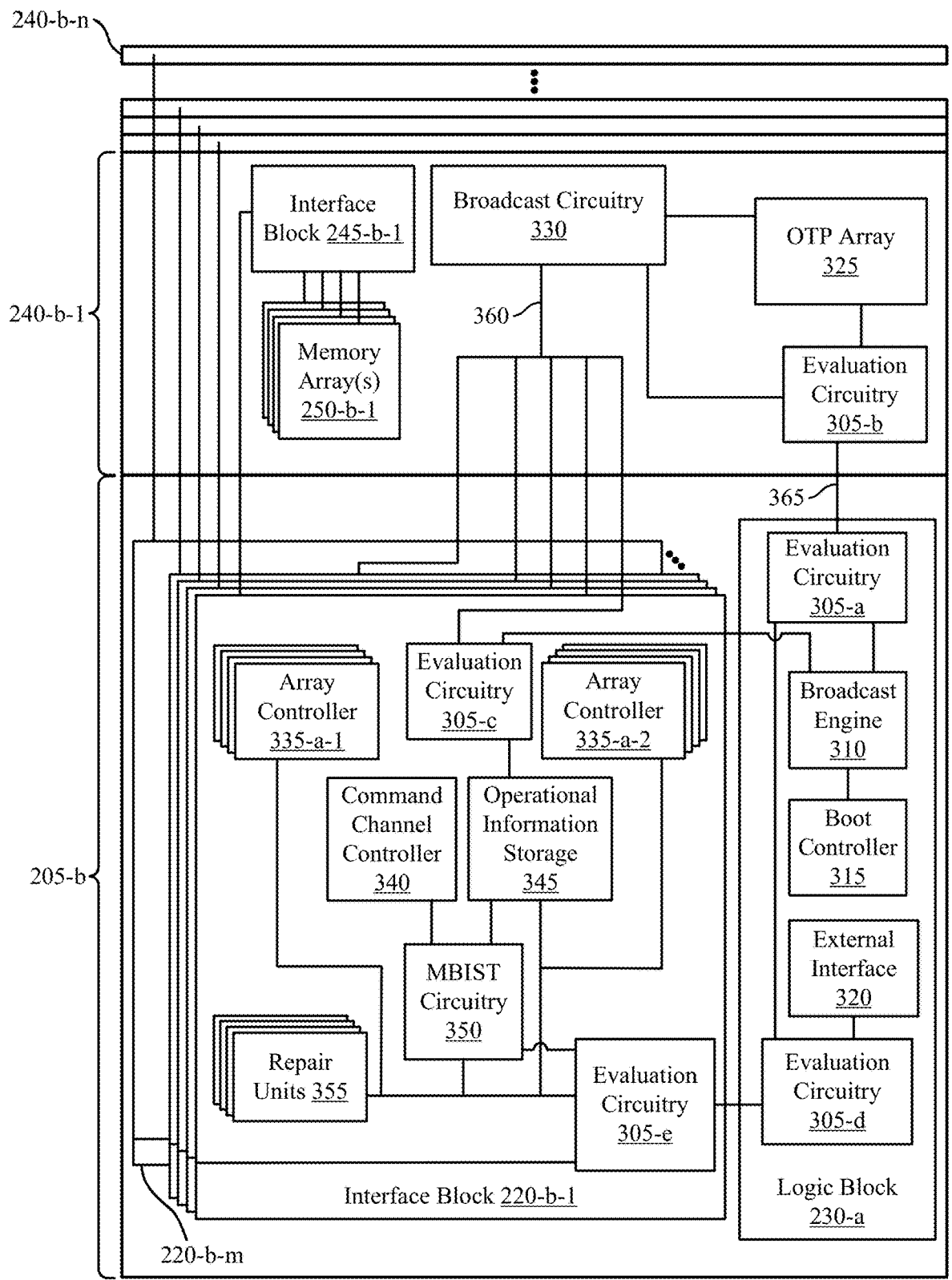
FIG. 3 shows an example of a system that supports information broadcast techniques for stacked memory architectures in accordance with examples as disclosed herein.

FIG. 3 shows an example of a system 300 that supports information broadcast techniques for stacked memory architectures in accordance with examples as disclosed herein. The system 300 be an example of and implement aspects of a system 200, as described with reference to FIG. 1. For example, the system 300 may implement a die 205-*b* (e.g., a logic die) and one or more dies 240-*b* (e.g., dies 240-*b*-1 through 240-*b*-*n*, array dies). The die 205-*b* may include a set of multiple interface blocks 220-*b* (e.g., interface blocks 220-*b*-1 through 220-*b*-*m*) and a logic block 230-*a* coupled with each of the interface blocks 220-*b* of the set (e.g., via one or more buses 231). Each die 240-*b* may include one or more interface blocks 245-*b*, each coupled with a respective interface block 220-*b* (e.g., via one or more buses 221, 246, 255, via data channel contacts, via data channel contacts) and operable to access a respective set of memory arrays 250. For example, the interface block 220-*b*-1 may be configured to access one or more memory arrays 250-*b*-1 of the die 240-*b*-1 via the interface block 245-*b*-1. The system 300 illustrates an example for implementing non-volatile storage configured to store shared information that may be broadcast to (e.g., concurrently provided to) or otherwise provided to the interface blocks 220-*b* for initializing, accessing, or evaluating aspects of the system 300.

The system 300 may include one or more instances of evaluation circuitry 305 (e.g., evaluation interface circuitry, initialization circuitry, configuration circuitry) configured to communicate (e.g., transmit, receive) signaling between the logic block 230-*a*, the interface blocks 220-*b*, and the one or more dies 240-*b*. For example, the evaluation circuitry 305-*a* of the logic block 230-*a* may be configured to communicate with a respective instance of evaluation circuitry 305-*b* of one or more dies 240-*b* (e.g., evaluation circuitry 305-*b*-1 of the die 240-*b*-1) as well as evaluation circuitry 305-*d* of the logic block 230-*a*. Evaluation circuitry 305-*d* may be configured to communicate with a respective instance of evaluation circuitry 305-*e* of each of the interface blocks 220-*b*. Each interface block 220-*b* may also include a respective instance of evaluation circuitry 305-*c*.

The evaluation circuitry 305 may be configured to communicate information, such as commands, indications, or data, to support evaluation, initialization, or other configuration operations of the system 300. In some examples, one or more instances of the evaluation circuitry 305 may implement aspects of Joint Test Action Group (JTAG) standards, Institute of Electrical and Electronics Engineering (IEEE) standards (e.g., IEEE P1500 standards), or other standards, and may include features such as P1500 logic, P1500 terminals, or P1500 buses (e.g., providing a communicative coupling between P1500 terminals). For example, the evaluation circuitry 305-*a* may be an example of common P1500 logic, instances of the evaluation circuitry 305-*b* may be examples of a die-specific P1500 logic, instances of evaluation circuitry 305 may be examples of P1500 reception logic, the evaluation circuitry 305-*d* may be an example of a chain selection P1500 logic, and instances of the evaluation circuitry 305-*e* may be examples of MP bridge P1500 circuitry.

The logic block 230-*a* may implement a broadcast engine 310 (e.g., a broadcast direct memory access (DMA) engine, a broadcast master control) coupled with the evaluation circuitry 305 (e.g., evaluation circuitry 305-*a* and instances of evaluation circuitry 305-*c* of the interface blocks 220-*b*) and a boot controller 315. The boot controller 315 may be operable to communicate commands (e.g., boot commands, initialization commands) with the broadcast engine 310. The logic block 230-*a* may also include an external interface 320, which may provide an externally-accessible interface (e.g., a P1500 connection, a JTAG connection, via one or more contacts 233), a host interface (e.g., via a bus 232, a host connection), or both. In some examples, the external interface 320 may be coupled with the evaluation circuitry 305 (e.g., evaluation circuitry 305-*d*), and may be configured to communicate signaling to or from the system 300.

Each interface block 220-*b* may include respective memory built-in self-test (MBIST) circuitry 350, which may be an example of an MBIST engine or other MBIST logic. Each interface block 220-*b* also may include a respective command channel controller 340, which may communicate control signaling (e.g., command signaling) with a respective interface block 245-*b* (e.g., command channel controller 340 of the interface block 220-*b*-1 for communicating control signaling with the interface block 245-*b*-1). In some implementations MBIST circuitry 350 may be operable to communicate signaling with a corresponding interface block 245-*b* using a respective command channel controller 340 of a given interface block 220-*b*.

Each interface block 220-*b* may also include a set of one or more array controllers 335 (e.g., array controllers 335-*a*-1 and 335-*a*-2), which may be coupled with MBIST circuitry 350, evaluation circuitry 305-*e*, repair units 355 (e.g., repair controllers), or a combination thereof. The array controllers 335 may be configured to facilitate operations (e.g., access operations) of the respective memory arrays 250-*b* (e.g., via an interface block 245-*b*). The repair units 355 may also be coupled with the MBIST circuitry 350 and the evaluation circuitry 305-*e*, and may be configured to store or implement repair information (e.g., column repair information, row repair information, redundancy information) for operating respective memory arrays 250-*b* (e.g., via an interface block 245), which may, in some examples, be supported by channel-specific information stored in an OTP array 325. In some cases, the interface blocks 220-*b* may include error control logic operable to process error correction code (ECC) information, cyclic redundancy check (CRC) information, or parity information stored in one or more OTP arrays 325 of one or more dies 240-*b*. The MBIST circuitry 350 may include or operate as a controller associated with performing evaluation, initialization, or configuration operations of the respective interface block 220-*b*. For example, the MBIST circuitry 350 of the interface block 220-*b*-1 may facilitate evaluating, initializing or configuring, via the interface block 220-*b*-1 and the interface block 245-*b*-1, the one or more memory arrays 250-*b*-1. The interface blocks 220-*b* may also include respective operational information storage 345 which may be configured to store configuration information for the interface block 220-*b*. In some examples, operational information storage 345 may include RAM, such as DRAM or SRAM storage locations of the die 205-*b*, and may operate as temporary storage for information received from one or more OTP arrays 325.

One or more of the dies 240-*b* may include a respective OTP array 325, which each may be an example of an NV array 270. The dies 240-*b* may each include an OTP array 325, where each OTP array 325 is coupled via one or more signal paths. An OTP array 325 may include a set of OTP memory elements, which may be examples of fuses, antifuses, or other read-only memory elements. The OTP memory elements may be configured to store information, which may be programmed to the OTP memory elements during manufacturing the system 300, during operation of the system 300, or a combination thereof. In some cases, the OTP memory elements may be configured to be accessed by the interface blocks 220-*b* via broadcast circuitry 330 at one or more of the dies 240-*b*. For example, the broadcast circuitry 330 of the die 240-*b*-1 may be coupled with each interface block 220-*b* of the die 205-*b* and may be configured to communicate information from the OTP memory elements to the MBIST circuitry 350 (e.g., via the evaluation circuitry 305-*c*, via operational information storage 345).

At least a portion of the OTP memory elements (e.g., of one or more OTP arrays 325) may be configured to store shared information, which may include patch table information, program information, common default overrides, channel group unique items, or other information associated with initializing, accessing, or evaluating aspects of the system 300. In some cases, the OTP memory elements may be configured to store error correction code (ECC) information, cyclic redundancy check (CRC) information, or parity information associated with the shared information. In some examples, a portion of the OTP memory elements may be configured to store channel-specific information, where each portion of channel-specific information may be associated with operating a respective interface block 220-*b* of the set of interface blocks 220-*b* of the die 205-*b*. In some examples, the channel-specific information may include patch table information, column repair information, row repair information, memory die trim parameters, memory die test mode information, logic die trim information, through-silicon via (TSV) sparing information, memory die timing information, and local advanced peripheral bus (APB) program information. In some examples, the portion of the OTP memory elements storing shared information may be implemented in the OTP array 325 of the die 240-*b*-1. However, in other examples, the portion of the OTP memory elements storing shared information may be implemented in one or more OTP arrays 325 of multiple dies 240-*b*.

The logic block 230-*a* may determine to perform an initialization or evaluation operation of the interface blocks 220-*b*. In some cases, the logic block 230-*a* may determine to perform an initialization or evaluation operation based on receiving a command, via the external interface 320 (e.g., from a host, from an external evaluation component), to perform the initialization or evaluation operation. In some such cases, the external interface 320 may transmit signaling to the evaluation circuitry 305 (e.g., the evaluation circuitry 305-*d*, the evaluation circuitry 305-*a*) indicating to perform the initialization or evaluation operation. In some cases, the logic block 230-*a* may determine to perform an initialization or evaluation operation based on receiving an indication or identifying a configuration at the boot controller 315. For example, the boot controller 315 may include initialization configuration information indicating to the logic block 230-*a* to perform an initialization or evaluation operation based on conditions (e.g., initialization conditions) detected at the system 300. In some such cases, the boot controller 315 may transmit signaling to the evaluation circuitry 305 (e.g., the evaluation circuitry 305-*a*, the evaluation circuitry 305-*d*) indicating to perform the initialization or evaluation operation. In some other cases, the logic block 230-*a* may determine to perform the initialization or evaluation operation based on a power condition detected at the system 300. For example, the logic block 230-*a* may determine to perform the initialization or evaluation operation based on the system 300 transitioning from a low power mode to a high power mode (e.g., entering an operational power mode, exiting an idle, standby, inactive, deep sleep, or other low power mode). In some implementation, determining to perform the initialization or evaluation operation may include determining whether a power consumption threshold or a threshold difference in power consumption has been satisfied.

In some cases, based on determining to perform the initialization or evaluation operation, the broadcast engine 310 may transmit a command via the evaluation circuitry 305 (e.g., from the evaluation circuitry 305-*a* to the evaluation circuitry 305-*b*, via a bus 365, which may be a command bus) to the OTP array 325 or the broadcast circuitry 330 to broadcast the shared information from the OTP array 325 (e.g., or additional OTP arrays 325 implementing OTP memory elements storing the shared information). In some such cases, one or more OTP arrays 325 may communicate the shared information to the broadcast circuitry 330 or the broadcast circuitry 330 may retrieve the shared information from the OTP array 325, and the broadcast circuitry 330 may transmit the shared information to the evaluation circuitry 305-*c* of each interface block 220-*b* of the die 205-*b* (e.g., via a bus 360, a shared bus, a broadcast bus). In some examples, retrieving information from an OTP array 325 may be associated with an indication of an address of an OTP array 325 and a length of information. The evaluation circuitry 305-*c* may transmit the shared information to the MBIST circuitry 350, where the shared information may be used to perform the initialization or evaluation operation. In some examples, a last instruction of the information provided from an OTP array may initiate performing one or more MBIST operations. In some examples, the broadcast engine 310 may transmit a command to the evaluation circuitry 305 (e.g., the evaluation circuitry 305-*c*) of the interface blocks 220-*b* to monitor for the shared information from the broadcast circuitry 330 (e.g., to monitor the bus 360), prior to or during the broadcast circuitry 330 transmitting the shared information.

In some cases, based on determining to perform the initialization or evaluation operation, the broadcast engine 310 may transmit a command to the respective evaluation circuitry 305-*c* of the interface blocks 220-*b* to retrieve the shared information (e.g., from one or more OTP arrays, from broadcast circuitry 330). The evaluation circuitry 305-*c* may transmit an indication to broadcast circuitry 330 to retrieve the shared information from one or more OTP arrays 325, where the broadcast circuitry 330 may transmit the shared information to the evaluation circuitry 305-*c* in response. The evaluation circuitry 305-*c* may transmit the shared information to the respective MBIST circuitry 350, where the shared information may be used to perform the initialization or evaluation operation. In some examples, the broadcast engine 310 may transmit a command to broadcast circuitry 330 to transmit the shared information to one or more instances of evaluation circuitry 305-*c* based on transmitting the command to one or more instances of evaluation circuitry 305-*c* to retrieve the shared information.

In some examples, performing the initialization or evaluation operation may include performing an error control operation (e.g., at one or more OTP arrays 325, at one or more instances of broadcast circuitry 330, at one or more of the interface blocks 220) on the shared information prior to performing the initialization or evaluation operation. Performing the error control may include using the ECC information, CRC information, or parity information to detect errors in the shared information prior to performing the initialization or evaluation operation. In some implementations, after detecting one or more errors in the shared information, the error control logic may correct the one or more errors, or transmit an indication to retransmit the shared information.

Implementing the shared information may decrease latency or bandwidth otherwise associated with initializing or evaluating aspects of the system 300. For example, broadcasting the shared information may prevent latency associated with each interface block 220-*b* attempting to retrieve information for performing the initialization or evaluation operation. In some examples, implementing the shared information may decrease storage otherwise associated with storing information for each individual interface block 220-*b* of the die 205-*b*, thereby conserving space at the system 300.

Figure 4:
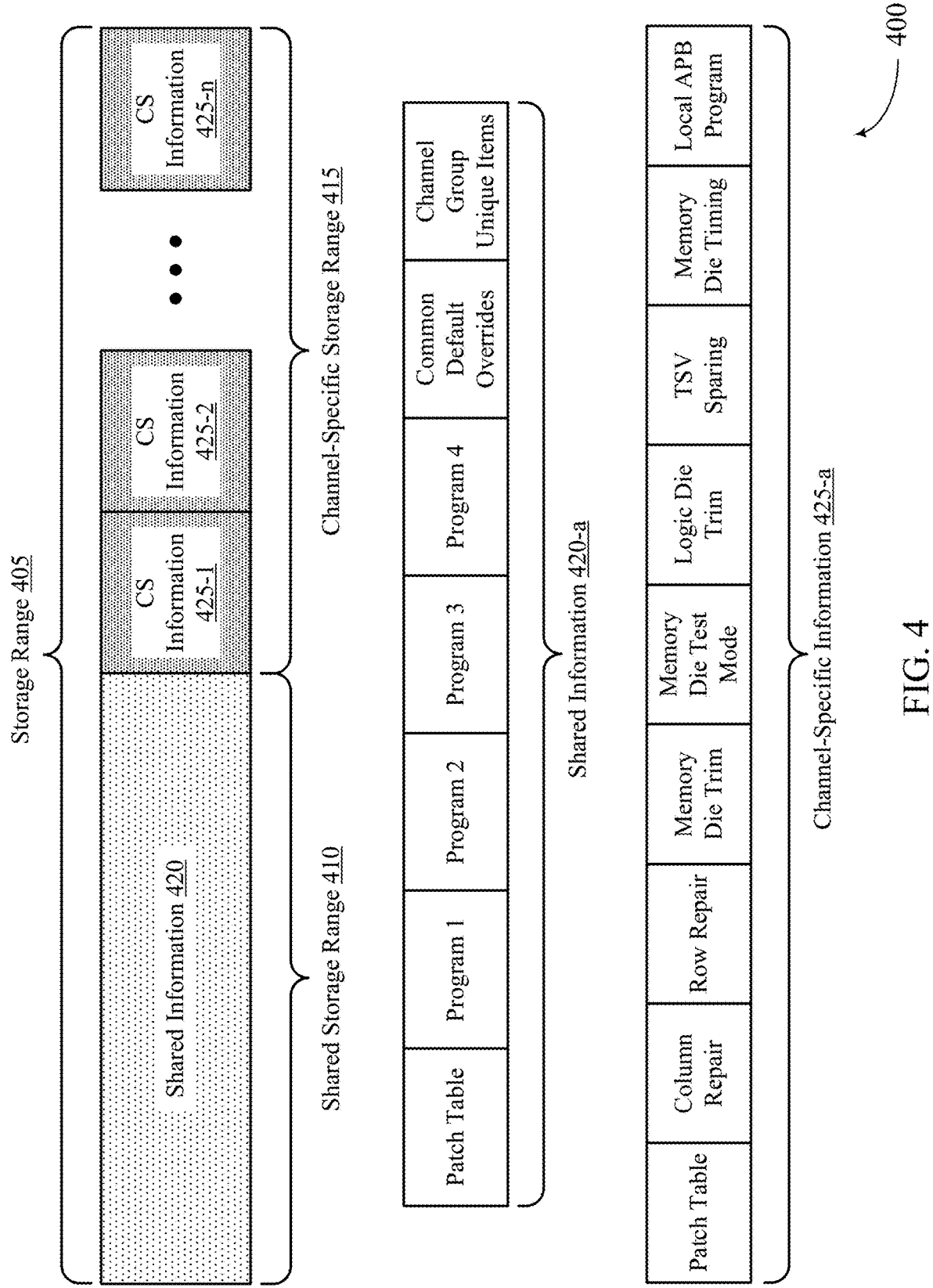
FIG. 4 shows an example of a one-time programmable memory element layout that supports information broadcast techniques for stacked memory architectures in accordance with examples as disclosed herein.

FIG. 4 shows an example of a storage allocation 400 that supports information broadcast techniques for stacked memory architectures in accordance with examples as disclosed herein. The storage allocation 400 depicts a storage range 405 (e.g., a range of physical addresses, a range of logical addresses, a range of storage elements, a quantity of storage elements), which may represent an amount (e.g., a total amount) of storage allocated to information for operations of a set of multiple interface blocks 220 (e.g., n interface blocks 220) of a system 200.

The storage range 405 may be implemented in read-only storage of a system 200, such as one or more NV arrays 270 (e.g., ROM arrays) or one or more OTP arrays 325. For example, the storage range 405 may be associated with a quantity of fuses, antifuses, or other read-only memory elements, or a combination thereof. Storage elements of the storage range 405 may be programmed during manufacturing of a system 200 (e.g., during fabrication, during assembly, during validation), during operation of a system 200 (e.g., during a functional implementation of the system 200), or a combination thereof. In various implementations, the storage range 405 may refer to storage elements that are located in a single die 240 of a system 200 (e.g., a die directly adjacent to a die 205), or may refer to storage elements that are distributed among multiple dies 240 of a system 200, among other implementations.

The storage allocation 400 depicts an allocation of the storage range 405 for shared information 420, which may be common to the set of interface blocks 220, and allocations of the storage range 405 for channel-specific (CS) information 425, which may be specific to a corresponding one of the set of interface blocks 220. For example, the storage range 405 may include a shared storage range 410 that is configured to store the shared information 420. The storage range 405 may also include a channel-specific storage range 415 that is configured to store multiple instances of channel-specific information 425 (e.g., channel-specific information 425-1 through 425-*n*, to support the n interface blocks 220).

The shared information 420 of the shared storage range 410 may be accessible by each of a set of multiple interface blocks 220 of a system 200 (e.g., to support aspects of initialization operations, evaluation operations, configuration operations, access operations, or other operations that are common among the multiple interface blocks 220). In some examples, a system 200 may be configured to broadcast at least a portion of the shared information 420 (e.g., in one or more transfers of information from the shared storage range 410) to all of the associated interface blocks 220, which may be initiated by a logic block 230. In some examples, at least a portion of the shared information 420 may be provided to one or more interface blocks 220 in response to a request (e.g., a read command), which may be issued by a logic block 230 or by an interface block 220.

The shared information 420-*a* illustrates an example of information that may be stored in the shared storage range 410, and includes patch table information, program information (e.g., Program 1 information, Program 2 information, Program 3 information, Program 4 information), common default overrides (e.g., configuration overrides), and channel group unique items (e.g., configuration information associated with multiple channels). In some examples, program information of a shared storage range 410 may include programs or configurations to be implemented at least in part by a respective MBIST circuitry 350 of each of the set of interface blocks 220, which may be associated with performing initialization, evaluation, or other operations of the interface blocks 220. However, shared information 420 may include other examples of programs or other information that is common to the operations of the set of interface blocks 220 of a system 200.

Each instance of channel-specific information 425 of the channel-specific storage range 415 may be accessible by at least one (e.g., the corresponding one) of the set of interface blocks 220 of the system 200 (e.g., to support aspects of initialization operations, evaluation operations, configuration operations, access operations, or other operations that are specific to a respective one of interface blocks 220). For example, an instance of channel-specific information 425 may include information accessible by one of the interface blocks 220 to support operations or configurations associated with the one of the interface blocks 220, which may be associated with a respective channel or channel set (e.g., associated with at least a bus 221 and a bus 246 of the system 200). In some examples, at least a portion of an instance of channel-specific information 425 may be provided to the corresponding interface block 220 in response to a request (e.g., a read command), which may be issued by a logic block 230 or by the corresponding interface block 220.

The channel-specific information 425-*a* illustrates an example of information that may be stored in the channel-specific storage range 415, and includes patch table information (e.g., a mapping between patch files and locations of corresponding memory arrays 250), column repair information (e.g., information regarding repair mappings of redundant or backup columns), row repair information (e.g., information regarding repair mappings of redundant or backup rows), memory die trim parameters (e.g., timing parameters, voltage parameters), memory die test mode information (e.g., test configurations), logic die trim information, TSV sparing information (e.g., information regarding repair mappings of redundant or backup TSVs), memory die timing information, and local advanced peripheral bus (APB) program information. However, channel-specific information 425 may include other examples of programs or other information that is specific to the operations of one of the set of multiple interface blocks 220 of the system 200.

Figure 5:
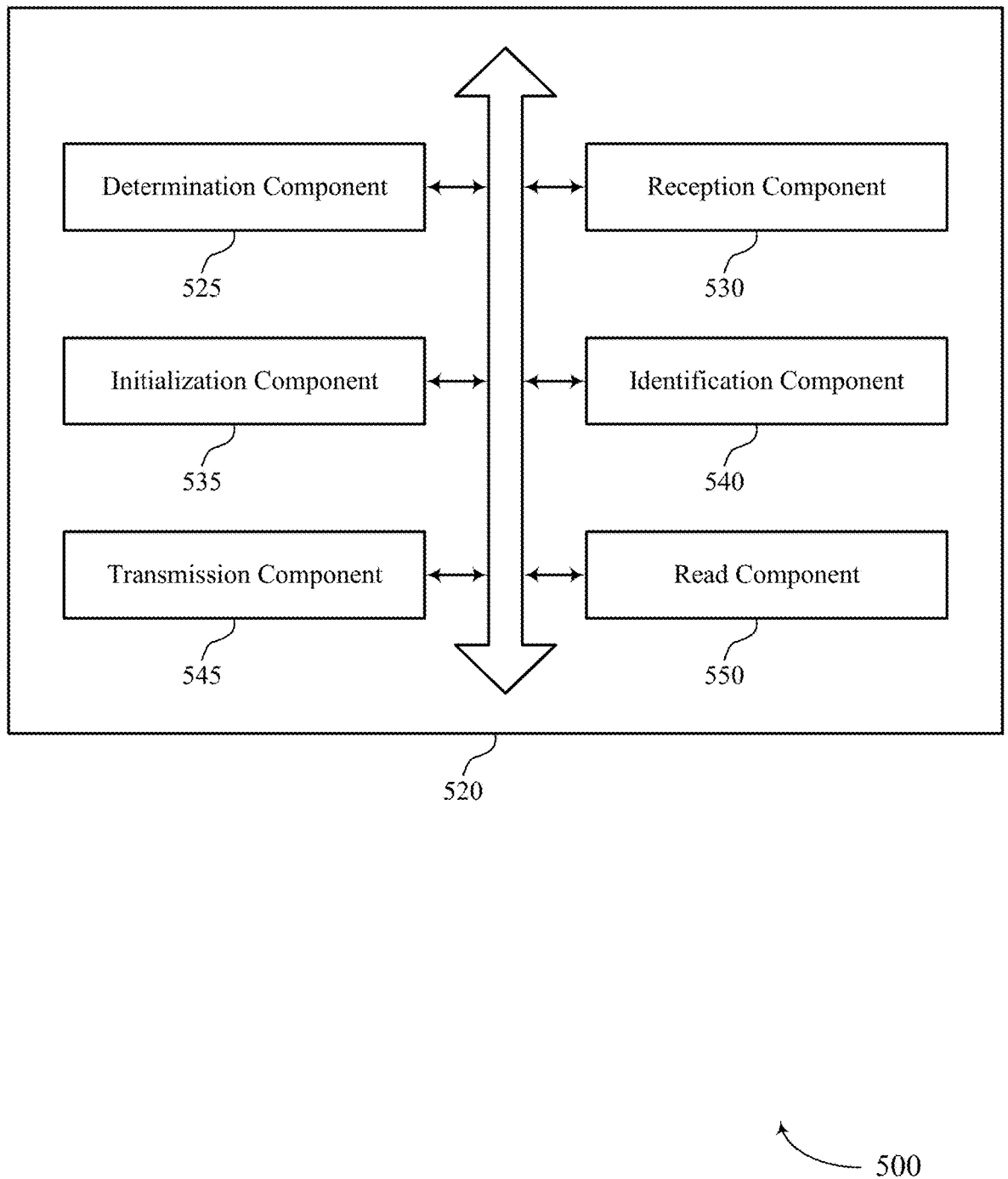
FIG. 5 shows a block diagram of a memory system that supports information broadcast techniques for stacked memory architectures in accordance with examples as disclosed herein.

FIG. 5 shows a block diagram 500 of a memory system 520 that supports information broadcast techniques for stacked memory architectures in accordance with examples as disclosed herein. The memory system 520 may be an example of aspects of a memory system as described with reference to FIGS. 1 through 4. The memory system 520, or various components thereof, may be an example of means for performing various aspects of information broadcast techniques for stacked memory architectures as described herein. For example, the memory system 520 may include a determination component 525, a reception component 530, an initialization component 535, an identification component 540, a transmission component 545, a read component 550, or any combination thereof. Each of these components may communicate, directly or indirectly, with one another (e.g., via one or more buses).

The determination component 525 may be configured as or otherwise support a means for determining, by a common logic block of a first semiconductor die of the memory system 520, to initiate an initialization of a plurality of first interface blocks of the first semiconductor die coupled with the common logic block, each of the plurality of first interface blocks coupled with a respective second interface block of one or more second semiconductor dies of the memory system 520, coupled with the first semiconductor die, that is operable to access one or more respective memory arrays of the one or more second semiconductor dies. The reception component 530 may be configured as or otherwise support a means for receiving, at each first interface block of the plurality of first interface blocks, information from a plurality of one-time programmable memory elements located in at least one of the one or more second semiconductor dies based on the common logic block determining to initiate the initialization of the plurality of first interface blocks. The initialization component 535 may be configured as or otherwise support a means for initializing the plurality of first interface blocks based on each first interface block receiving the information from the plurality of one-time programmable memory elements.

In some examples, the information is received at each first interface block of the plurality of first interface blocks via a bus coupling the plurality of one-time programmable memory elements with each first interface block of the plurality of first interface blocks.

In some examples, the reception component 530 may be configured as or otherwise support a means for receiving, at the common logic block, a command to initialize the plurality of first interface blocks, and the common logic block determining to initiate the initialization of the plurality of first interface blocks may be based on receiving the command.

In some examples, the identification component 540 may be configured as or otherwise support a means for identifying a change of a power condition of the first semiconductor die, and the common logic block determining to initiate the initialization of the plurality of first interface blocks may be based on identifying the change of the power condition.

In some examples, the identification component 540 may be configured as or otherwise support a means for identifying an initialization configuration stored in the common logic block, and determining to initialize the plurality of first interface blocks may be based on identifying the initialization configuration.

In some examples, the transmission component 545 may be configured as or otherwise support a means for transmitting, from the common logic block, an indication for circuitry coupled with the plurality of one-time programmable memory elements to transmit the information to each first interface block of the plurality of first interface blocks, and receiving the information at each first interface block of the plurality of first interface blocks may be based on the indication to transmit the information.

In some examples, the transmission component 545 may be configured as or otherwise support a means for transmitting, from the common logic block to the plurality of first interface blocks, an indication to monitor for the information, and receiving the information at each first interface block of the plurality of first interface blocks may be based on the indication to monitor for the information.

In some examples, the read component 550 may be configured as or otherwise support a means for reading, by each first interface block of the plurality of first interface blocks, the information from the plurality of one-time programmable memory elements, and receiving the information at each first interface block of the plurality of first interface blocks may be based on reading the information.

In some examples, initializing the plurality of first interface blocks includes performing one or more operations via the respective second interface blocks to configure access operations associated with the respective one or more memory arrays.

In some examples, the reception component 530 may be configured as or otherwise support a means for receiving, at one or more first interface blocks of the plurality of first interface blocks, respective second information from the plurality of one-time programmable memory elements, the respective second information associated with respective operations of each of the one or more first interface blocks.

In some examples, the plurality of one-time programmable memory elements are located in one of the one or more second semiconductor dies.

In some examples, the plurality of one-time programmable memory elements are located in at least two of the one or more second semiconductor dies.

In some examples, the determination component 525 may be configured as or otherwise support a means for determining, by a common logic block of a first semiconductor die of the memory system 520, to broadcast information, from a plurality of one-time programmable memory elements located in a second semiconductor die of one or more second semiconductor dies coupled with the first semiconductor die, to a plurality of first interface blocks located in the first semiconductor die. In some examples, the reception component 530 may be configured as or otherwise support a means for receiving, at each first interface block of the plurality of first interface blocks, the information from the plurality of one-time programmable memory elements based on the determination to broadcast the information. In some examples, the initialization component 535 may be configured as or otherwise support a means for performing operations of the plurality of first interface blocks based on each first interface block receiving the information from the plurality of one-time programmable memory elements.

In some examples, the information is received at each first interface block of the plurality of first interface blocks via a bus that couples the plurality of one-time programmable memory elements with each first interface block of the plurality of first interface blocks.

Figure 6:
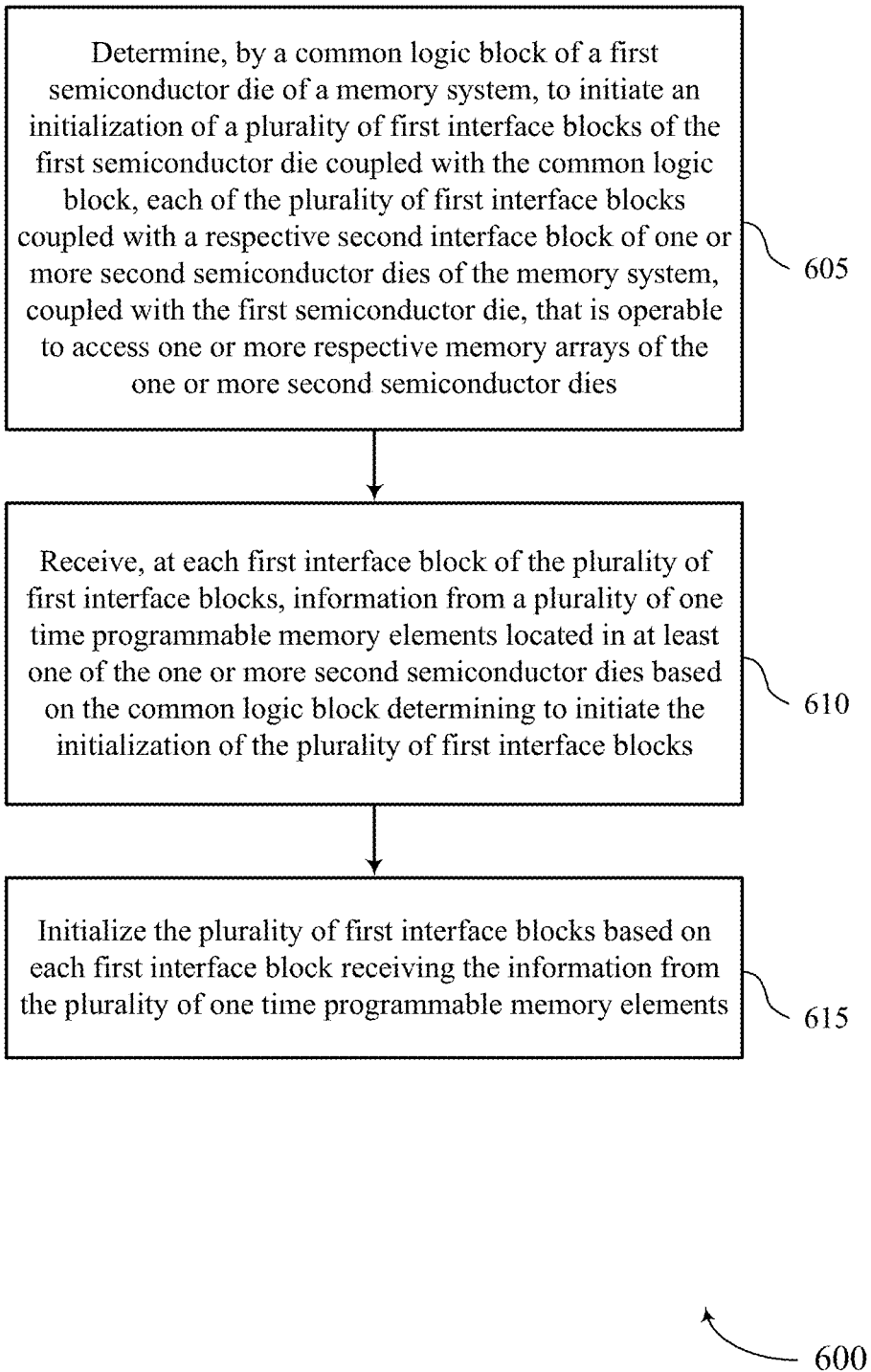
FIGS. 6 and 7 show flowcharts illustrating methods that support information broadcast techniques for stacked memory architectures in accordance with examples as disclosed herein.

FIG. 6 shows a flowchart illustrating a method 600 that supports information broadcast techniques for stacked memory architectures in accordance with examples as disclosed herein. The operations of method 600 may be implemented by a memory system or its components as described herein. For example, the operations of method 600 may be performed by a memory system as described with reference to FIGS. 1 through 5. In some examples, a memory system may execute a set of instructions to control the functional elements of the device to perform the described functions. Additionally, or alternatively, the memory system may perform aspects of the described functions using special-purpose hardware.

At 605, the method may include determining, by a common logic block of a first semiconductor die of a memory system, to initiate an initialization of a plurality of first interface blocks of the first semiconductor die coupled with the common logic block, each of the plurality of first interface blocks coupled with a respective second interface block of one or more second semiconductor dies of the memory system, coupled with the first semiconductor die, that is operable to access one or more respective memory arrays of the one or more second semiconductor dies. In some examples, aspects of the operations of 605 may be performed by a determination component 525 as described with reference to FIG. 5. For example, the memory system may include a die 205 with a logic block 230 configured to initiate initialization, evaluation, or access operations on interface blocks 220 of the die 205, as described with reference to FIG. 3.

At 610, the method may include receiving, at each first interface block of the plurality of first interface blocks, information from a plurality of one-time programmable memory elements located in at least one of the one or more second semiconductor dies based on the common logic block determining to initiate the initialization of the plurality of first interface blocks. In some examples, aspects of the operations of 610 may be performed by a reception component 530 as described with reference to FIG. 5. For example, the memory system may include one or more OTP arrays 325 in one or more dies 240 of the memory system, where the one or more OTP arrays 325 include one-time programmable memory elements configured to store information associated with initializing the interface blocks 220 based on broadcasting the information from the one or more OTP arrays 325 to the interface blocks 220 based on one or more commands from the logic block 230, as described with reference to FIG. 3.

At 615, the method may include initializing the plurality of first interface blocks based on each first interface block receiving the information from the plurality of one-time programmable memory elements. In some examples, aspects of the operations of 615 may be performed by an initialization component 535 as described with reference to FIG. 5. For example, the interface blocks 220 may use the information received from the one or more OTP arrays 325 to initialize the interface blocks 220, as described with reference to FIG. 3.

In some examples, an apparatus as described herein may perform a method or methods, such as the method 600. The apparatus may include operations, features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for determining, by a common logic block of a first semiconductor die of a memory system, to initiate an initialization of a plurality of first interface blocks of the first semiconductor die coupled with the common logic block, each of the plurality of first interface blocks coupled with a respective second interface block of one or more second semiconductor dies of the memory system, coupled with the first semiconductor die, that is operable to access one or more respective memory arrays of the one or more second semiconductor dies; receiving, at each first interface block of the plurality of first interface blocks, information from a plurality of one-time programmable memory elements located in at least one of the one or more second semiconductor dies based on the common logic block determining to initiate the initialization of the plurality of first interface blocks; and initializing the plurality of first interface blocks based on each first interface block receiving the information from the plurality of one-time programmable memory elements.

Aspect 2: The method, apparatus, or non-transitory computer-readable medium of aspect 1, where the information is received at each first interface block of the plurality of first interface blocks via a bus operable to couple the plurality of one-time programmable memory elements with each first interface block of the plurality of first interface blocks.

Aspect 3: The method, apparatus, or non-transitory computer-readable medium of any of aspects 1 through 2, further including operations, features, circuitry, logic, means, or instructions, or any combination thereof for receiving, at the common logic block, a command to initialize the plurality of first interface blocks, where the common logic block determining to initiate the initialization of the plurality of first interface blocks is based on receiving the command.

Aspect 4: The method, apparatus, or non-transitory computer-readable medium of any of aspects 1 through 3, further including operations, features, circuitry, logic, means, or instructions, or any combination thereof for identifying a change of a power condition of the first semiconductor die, where the common logic block determining to initiate the initialization of the plurality of first interface blocks is based on identifying the change of the power condition.

Aspect 5: The method, apparatus, or non-transitory computer-readable medium of any of aspects 1 through 4, further including operations, features, circuitry, logic, means, or instructions, or any combination thereof for identifying an initialization configuration stored in the common logic block, where determining to initialize the plurality of first interface blocks is based on identifying the initialization configuration.

Aspect 6: The method, apparatus, or non-transitory computer-readable medium of any of aspects 1 through 5, further including operations, features, circuitry, logic, means, or instructions, or any combination thereof for transmitting, from the common logic block, an indication for circuitry coupled with the plurality of one-time programmable memory elements to transmit the information to each first interface block of the plurality of first interface blocks, where receiving the information at each first interface block of the plurality of first interface blocks is based on the indication to transmit the information.

Aspect 7: The method, apparatus, or non-transitory computer-readable medium of aspect 6, further including operations, features, circuitry, logic, means, or instructions, or any combination thereof for transmitting, from the common logic block to the plurality of first interface blocks, an indication to monitor for the information, where receiving the information at each first interface block of the plurality of first interface blocks is based on the indication to monitor for the information.

Aspect 8: The method, apparatus, or non-transitory computer-readable medium of any of aspects 1 through 7, further including operations, features, circuitry, logic, means, or instructions, or any combination thereof for reading, by each first interface block of the plurality of first interface blocks, the information from the plurality of one-time programmable memory elements, where receiving the information at each first interface block of the plurality of first interface blocks is based on reading the information.

Aspect 9: The method, apparatus, or non-transitory computer-readable medium of any of aspects 1 through 8, where initializing the plurality of first interface blocks includes performing one or more operations via the respective second interface blocks to configure access operations associated with the respective one or more memory arrays.

Aspect 10: The method, apparatus, or non-transitory computer-readable medium of any of aspects 1 through 9, further including operations, features, circuitry, logic, means, or instructions, or any combination thereof for receiving, at one or more first interface blocks of the plurality of first interface blocks, respective second information from the plurality of one-time programmable memory elements, the respective second information associated with respective operations of each of the one or more first interface blocks.

Aspect 11: The method, apparatus, or non-transitory computer-readable medium of any of aspects 1 through 10, where the plurality of one-time programmable memory elements are located in one of the one or more second semiconductor dies.

Aspect 12: The method, apparatus, or non-transitory computer-readable medium of any of aspects 1 through 10, where the plurality of one-time programmable memory elements are located in at least two of the one or more second semiconductor dies.

Figure 7:
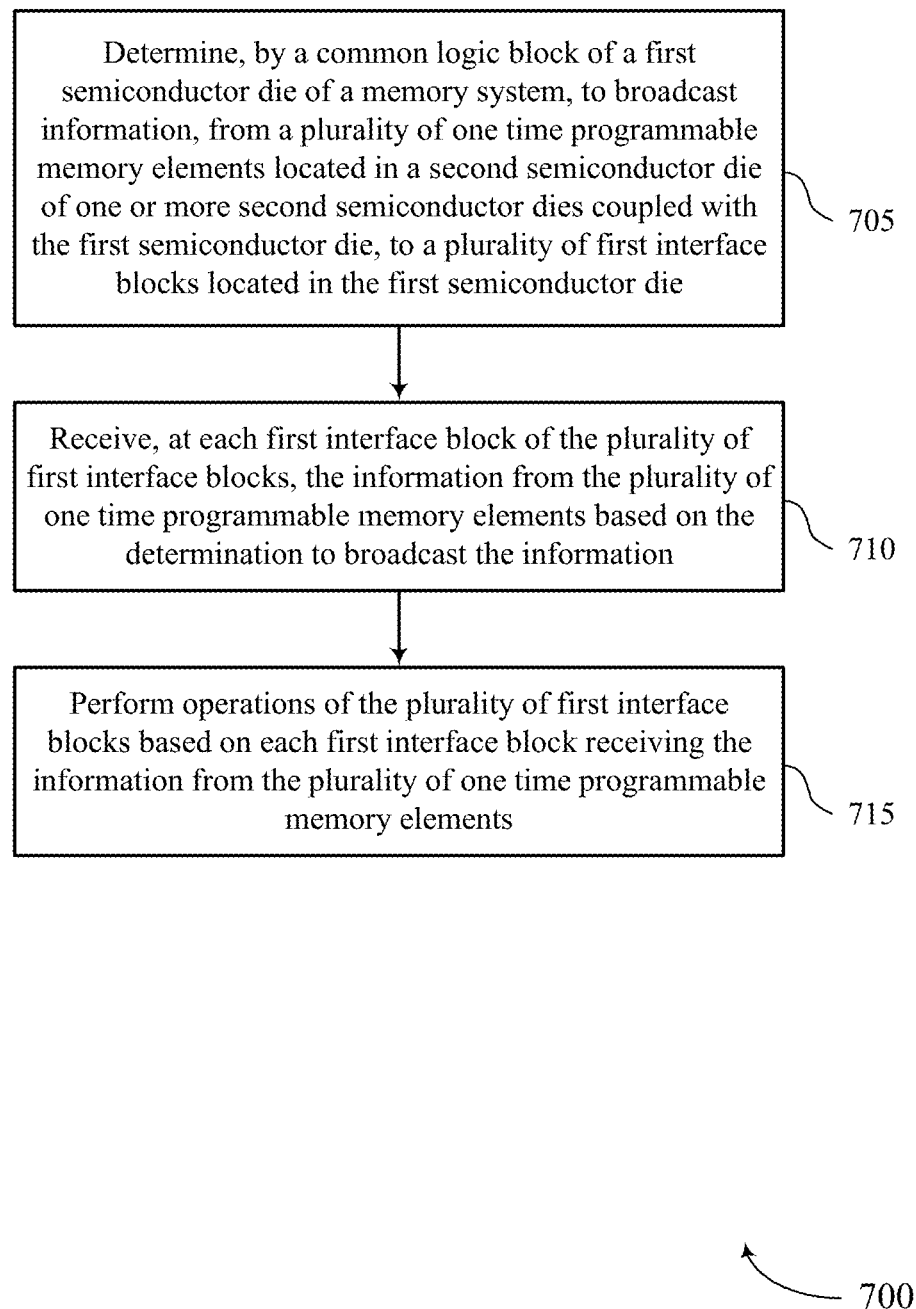

FIG. 7 shows a flowchart illustrating a method 700 that supports information broadcast techniques for stacked memory architectures in accordance with examples as disclosed herein. The operations of method 700 may be implemented by a memory system or its components as described herein. For example, the operations of method 700 may be performed by a memory system as described with reference to FIGS. 1 through 5. In some examples, a memory system may execute a set of instructions to control the functional elements of the device to perform the described functions. Additionally, or alternatively, the memory system may perform aspects of the described functions using special-purpose hardware.

At 705, the method may include determining, by a common logic block of a first semiconductor die of a memory system, to broadcast information, from a plurality of one-time programmable memory elements located in a second semiconductor die of one or more second semiconductor dies coupled with the first semiconductor die, to a plurality of first interface blocks located in the first semiconductor die. In some examples, aspects of the operations of 705 may be performed by a determination component 525 as described with reference to FIG. 5. For example, the memory system may include a die 205 with a logic block 230 configured to broadcast information associated with initializing interface blocks 220 of the die 205 from one or more OTP arrays 325 including one-time programmable memory elements configured to store the information, as described with reference to FIG. 3.

At 710, the method may include receiving, at each first interface block of the plurality of first interface blocks, the information from the plurality of one-time programmable memory elements based on the determination to broadcast the information. In some examples, aspects of the operations of 710 may be performed by a reception component 530 as described with reference to FIG. 5. For example, the interface blocks 220 may receive the information broadcasted from the one or more OTP arrays 325 based on one or more commands from the logic block 230, as described with reference to FIG. 3.

At 715, the method may include performing operations of the plurality of first interface blocks based on each first interface block receiving the information from the plurality of one-time programmable memory elements. In some examples, aspects of the operations of 715 may be performed by an initialization component 535 as described with reference to FIG. 5. For example, the interface blocks 220 may use the information received from the one or more OTP arrays 325 to initialize the interface blocks 220, as described with reference to FIG. 3.

In some examples, an apparatus as described herein may perform a method or methods, such as the method 700. The apparatus may include operations, features, circuitry, logic, means, or instructions (e.g., a non-transitory computer-readable medium storing instructions executable by a processor), or any combination thereof for performing the following aspects of the present disclosure:

Aspect 13: A method, apparatus, or non-transitory computer-readable medium including operations, features, circuitry, logic, means, or instructions, or any combination thereof for determining, by a common logic block of a first semiconductor die of a memory system, to broadcast information, from a plurality of one-time programmable memory elements located in a second semiconductor die of one or more second semiconductor dies coupled with the first semiconductor die, to a plurality of first interface blocks located in the first semiconductor die; receiving, at each first interface block of the plurality of first interface blocks, the information from the plurality of one-time programmable memory elements based on the determination to broadcast the information; and performing operations of the plurality of first interface blocks based on each first interface block receiving the information from the plurality of one-time programmable memory elements.

Aspect 14: The method, apparatus, or non-transitory computer-readable medium of aspect 13, where the information is received at each first interface block of the plurality of first interface blocks via a bus operable to couple the plurality of one-time programmable memory elements with each first interface block of the plurality of first interface blocks.

It should be noted that the methods described herein describe possible implementations, and that the operations and the steps may be rearranged or otherwise modified and that other implementations are possible. Further, portions from two or more of the methods may be combined.

An apparatus is described. The following provides an overview of aspects of the apparatus as described herein:

Aspect 15: An apparatus, including: a first semiconductor die of a memory system, the first semiconductor die including: a common logic block; and a plurality of first interface blocks coupled with the common logic block; and one or more second semiconductor dies of the memory system coupled with the first semiconductor die and including: a plurality of second interface blocks, each second interface block coupled with a respective one of the plurality of first interface blocks; a plurality of memory arrays, each memory array coupled with one of the plurality of second interface blocks; and a plurality of one-time programmable memory elements operable to store information associated with operations of the plurality of first interface blocks, where the common logic block includes logic circuitry operable to initiate a broadcast of at least a portion of the information to the plurality of first interface blocks.

Aspect 16: The apparatus of aspect 15, where a second semiconductor die of the one or more second semiconductor dies is coupled with the first semiconductor die based on a fusion of a plurality of second conductive contacts of the second semiconductor die with a plurality of first conductive contacts of the first semiconductor die that electrically couple each second interface block with the respective one of the plurality of first interface blocks.

Aspect 17: The apparatus of any of aspects 15 through 16, where each first interface block of the plurality of first interface blocks is associated with accessing one or more memory arrays of the plurality of memory arrays via the respective second interface block coupled with the first interface block.

Aspect 18: The apparatus of any of aspects 15 through 17, further including: a bus coupling each first interface block of the plurality of first interface blocks with the plurality of one-time programmable memory elements, where the broadcast of the at least portion of the information is communicated via the bus.

Aspect 19: The apparatus of any of aspects 15 through 18, further including: a command bus coupling the common logic block with the plurality of one-time programmable memory elements, the command bus operable to transfer a command from the common logic block to initiate the broadcast.

Aspect 20: The apparatus of any of aspects 15 through 19, where the plurality of one-time programmable memory elements are operable to store respective second information associated with respective operations of at least one first interface block of the plurality of first interface blocks.

Aspect 21: The apparatus of any of aspects 15 through 20, where the plurality of one-time programmable memory elements are located in one of the one or more second semiconductor dies.

Aspect 22: The apparatus of any of aspects 15 through 20, where the plurality of one-time programmable memory elements are located in at least two of the one or more second semiconductor dies.

Aspect 23: The apparatus of any of aspects 15 through 22, where the plurality of one-time programmable memory elements includes one or more fuses, one or more antifuses, or a combination thereof.

Aspect 24: The apparatus of any of aspects 15 through 23, further including: error control logic operable to process error correction code (ECC) information, cyclic redundancy information, or parity information associated with the information and stored in the plurality of one-time programmable memory elements.

Aspect 25: The apparatus of any of aspects 15 through 24, where the logic circuitry of the common logic block is further operable to: initiate an initialization of the plurality of first interface blocks that is based on the information stored in the plurality of one-time programmable memory elements.

Aspect 26: The apparatus of any of aspects 15 through 25, further including: evaluation interface circuitry operable to support evaluation operations of the memory system; and one or more terminals of the first semiconductor die coupled with the evaluation interface circuitry, the one or more terminals operable to communicate signaling associated with the evaluation operations with a device separate from the memory system, where the logic circuitry is operable to initiate the broadcast based on an indication received via the one or more terminals.

Aspect 27: The apparatus of aspect 26, where a first portion of the evaluation interface circuitry is included in the common logic block, and each second portion of a plurality of second portions of the evaluation interface circuitry is included in a respective first interface block of the plurality of first interface blocks.

Aspect 28: The apparatus of any of aspects 26 through 27, where the evaluation interface circuitry is operable to access the plurality of one-time programmable memory elements.

An apparatus is described. The following provides an overview of aspects of the apparatus as described herein:

Aspect 29: An apparatus, including: one or more first semiconductor dies of a memory system including a plurality of one-time programmable memory elements and a plurality of first interface blocks, each of the plurality of first interface blocks coupled with a respective one or more memory arrays; and a second semiconductor die of the memory system coupled with the one or more first semiconductor dies, the second semiconductor die including a common logic block coupled with a plurality of second interface blocks of the second semiconductor die, each of the plurality of second interface blocks coupled with a respective one of the plurality of first interface blocks, where the second semiconductor die is operable to: determine, at the common logic block, to initiate an initialization operation; receive, at each of the plurality of second interface blocks, information stored at the plurality of one-time programmable memory elements based on the common logic block determining to initiate the initialization operation; and perform the initialization operation at each of the plurality of second interface blocks based on the plurality of second interface blocks receiving the information from the plurality of one-time programmable memory elements.

An apparatus is described. The following provides an overview of aspects of the apparatus as described herein:

Aspect 30: An apparatus, including: a first semiconductor die including: a common logic block; and a plurality of first interface blocks coupled with the common logic block; and a plurality of second semiconductor dies coupled with the first semiconductor die, each of the plurality of second semiconductor dies including: a plurality of second interface blocks, each second interface block coupled with a respective one of the plurality of first interface blocks; and a plurality of memory arrays, each memory array coupled with one of the plurality of second interface blocks, where one of the plurality of second semiconductor dies includes a plurality of one-time programmable memory elements operable to store information associated with operations of the plurality of first interface blocks, where the common logic block includes logic circuitry operable to initiate an initialization of the plurality of first interface blocks based on the information stored in the plurality of one-time programmable memory elements.

Information and signals described herein may be represented using any of a variety of different technologies and techniques. For example, data, instructions, commands, information, signals, bits, or symbols of signaling that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (e.g., in conductive contact with, connected with, coupled with) one another if there is any electrical path (e.g., conductive path) between the components that can, at any time, support the flow of signals (e.g., charge, current, voltage) between the components. At any given time, a conductive path between components that are in electronic communication with each other (e.g., in conductive contact with, connected with, coupled with) may be an open circuit or a closed circuit based on the operation of the device that includes the connected components. A conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" (e.g., "electrically coupling") may refer to condition of moving from an open-circuit relationship between components in which signals are not presently capable of being communicated between the components (e.g., over a conductive path) to a closed-circuit relationship between components in which signals are capable of being communicated between components (e.g., over the conductive path). When a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other when the switch is open. When a controller isolates two components, the controller affects a change that prevents signals from flowing between the components using a conductive path that previously permitted signals to flow.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details to provide an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over as one or more instructions (e.g., code) on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and modules described in connection with the disclosure herein may be implemented or performed with a processor, such as a DSP, an ASIC, an FPGA, discrete gate logic, discrete transistor logic, discrete hardware components, other programmable logic device, or any combination thereof designed to perform the functions described herein. A processor may be an example of a microprocessor, a controller, a microcontroller, a state machine, or any type of processor. A processor may also be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a computer, or a processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:
1. An apparatus, comprising:
a first semiconductor die of a memory system, the first semiconductor die comprising:
a common logic block; and
a plurality of first interface blocks coupled with the common logic block; and one or more second semiconductor dies of the memory system coupled with the first semiconductor die and comprising:
  a plurality of second interface blocks, each second interface block coupled with a respective one of the plurality of first interface blocks;
  a plurality of memory arrays, each memory array coupled with one of the plurality of second interface blocks; and
  a plurality of one-time programmable memory elements operable to store information associated with operations of the plurality of first interface blocks,
wherein the common logic block comprises logic circuitry operable to initiate a broadcast of at least a portion of the information to the plurality of first interface blocks.

2. The apparatus of claim 1, wherein a second semiconductor die of the one or more second semiconductor dies is coupled with the first semiconductor die based on a fusion of a plurality of second conductive contacts of the second semiconductor die with a plurality of first conductive contacts of the first semiconductor die that electrically couples each second interface block with the respective one of the plurality of first interface blocks.

3. The apparatus of claim 1, wherein each first interface block of the plurality of first interface blocks is associated with accessing one or more memory arrays of the plurality of memory arrays via the respective second interface block coupled with the first interface block.

4. The apparatus of claim 1, further comprising:
  a bus coupling each first interface block of the plurality of first interface blocks with the plurality of one-time programmable memory elements, wherein the broadcast of the at least portion of the information is communicated via the bus.

5. The apparatus of claim 1, further comprising:
  a command bus coupling the common logic block with the plurality of one-time programmable memory elements, the command bus operable to transfer a command from the common logic block to initiate the broadcast.

6. The apparatus of claim 1, wherein the plurality of one-time programmable memory elements are operable to store respective second information associated with respective operations of at least one first interface block of the plurality of first interface blocks.

7. The apparatus of claim 1, wherein the plurality of one-time programmable memory elements are located in one of the one or more second semiconductor dies.

8. The apparatus of claim 1, wherein the plurality of one-time programmable memory elements are located in at least two of the one or more second semiconductor dies.

9. The apparatus of claim 1, wherein the plurality of one-time programmable memory elements comprises one or more fuses, one or more antifuses, or a combination thereof.

10. The apparatus of claim 1, further comprising:
  error control logic operable to process error correction code (ECC) information, cyclic redundancy information, or parity information associated with the information and stored in the plurality of one-time programmable memory elements.

11. The apparatus of claim 1, wherein the logic circuitry of the common logic block is further operable to:
  initiate an initialization of the plurality of first interface blocks that is based on the information stored in the plurality of one-time programmable memory elements.

12. The apparatus of claim 1, further comprising:
  evaluation interface circuitry operable to support evaluation operations of the memory system; and
  one or more terminals of the first semiconductor die coupled with the evaluation interface circuitry, the one or more terminals operable to communicate signaling associated with the evaluation operations with a device separate from the memory system,
  wherein the logic circuitry is operable to initiate the broadcast based on an indication received via the one or more terminals.

13. A method, comprising:
  determining, by a common logic block of a first semiconductor die of a memory system, to initiate an initialization of a plurality of first interface blocks of the first semiconductor die coupled with the common logic block, each of the plurality of first interface blocks coupled with a respective second interface block of one or more second semiconductor dies of the memory system, coupled with the first semiconductor die, that is operable to access one or more respective memory arrays of the one or more second semiconductor dies;
  receiving, at each first interface block of the plurality of first interface blocks, information from a plurality of one-time programmable memory elements located in at least one of the one or more second semiconductor dies based on the common logic block determining to initiate the initialization of the plurality of first interface blocks; and
  initializing the plurality of first interface blocks based on each first interface block receiving the information from the plurality of one-time programmable memory elements.

14. The method of claim 13, wherein the information is received at each first interface block of the plurality of first interface blocks via a bus operable to couple the plurality of one-time programmable memory elements with each first interface block of the plurality of first interface blocks.

15. The method of claim 13, further comprising:
  receiving, at the common logic block, a command to initialize the plurality of first interface blocks, wherein the common logic block determining to initiate the initialization of the plurality of first interface blocks is based on receiving the command.

16. The method of claim 13, further comprising:
  identifying a change of a power condition of the first semiconductor die, wherein the common logic block determining to initiate the initialization of the plurality of first interface blocks is based on identifying the change of the power condition.

17. The method of claim 13, further comprising:
  identifying an initialization configuration stored in the common logic block, wherein determining to initialize the plurality of first interface blocks is based on identifying the initialization configuration.

18. The method of claim 13, further comprising:
  transmitting, from the common logic block, an indication for circuitry coupled with the plurality of one-time programmable memory elements to transmit the information to each first interface block of the plurality of first interface blocks, wherein receiving the information at each first interface block of the plurality of first interface blocks is based on the indication to transmit the information.

19. The method of claim 18, further comprising:
transmitting, from the common logic block to the plurality of first interface blocks, an indication to monitor for the information, where receiving the information at each first interface block of the plurality of first interface blocks is based on the indication to monitor for the information.

20. An apparatus, comprising:
one or more first semiconductor dies of a memory system comprising a plurality of one-time programmable memory elements and a plurality of first interface blocks, each of the plurality of first interface blocks coupled with a respective one or more memory arrays; and a second semiconductor die of the memory system coupled with the one or more first semiconductor dies, the second semiconductor die comprising a common logic block coupled with a plurality of second interface blocks of the second semiconductor die, each of the plurality of second interface blocks coupled with a respective one of the plurality of first interface blocks, wherein the second semiconductor die is operable to:

determine, at the common logic block, to initiate an initialization operation;

receive, at each of the plurality of second interface blocks, information stored at the plurality of one-time programmable memory elements based on the common logic block determining to initiate the initialization operation; and perform the initialization operation at each of the plurality of second interface blocks based on the plurality of second interface blocks receiving the information from the plurality of one-time programmable memory elements.

* * * * *